United States Patent [19]

Tanimoto et al.

[11] Patent Number: 5,581,296

[45] Date of Patent: Dec. 3, 1996

[54] PRINTER HEAD DRIVING APPARATUS IMPROVING PRINTING SPEED

[75] Inventors: Koji Tanimoto, Kawasaki; Kunihiko Miura, Hiratsuka; Naoaki Ide, Yokohama, all of Japan

[73] Assignee: Kabushiki Kaisha Toshiba, Kanagawa-ken, Japan

[21] Appl. No.: 170,069

[22] Filed: Dec. 17, 1993

[30] Foreign Application Priority Data

Dec. 17, 1992 [JP] Japan .................................. 4-337105

[51] Int. Cl.⁶ .................................. B41J 2/47; B41J 2/435
[52] U.S. Cl. .................................. 347/237; 347/240
[58] Field of Search .................................. 347/237, 238, 347/240, 130, 236, 119; 358/298

[56] References Cited

U.S. PATENT DOCUMENTS 4,905,027  2/1990  Itoh et al. .................................. 347/237
5,225,848  7/1993  Smith et al. .................................. 347/237
5,241,324  8/1993  Tamura et al. .................................. 347/240

*Primary Examiner*—Benjamin R. Fuller
*Assistant Examiner*—Thinh Nguyen
*Attorney, Agent, or Firm*—Limbach & Limbach LLP

[57] ABSTRACT

In a printer head constituted by a large number of linearly arranged LEDs, a lighting time designator receives image data at a period corresponding to one scanning period, designates a lighting time of each LED within one scanning period in accordance with image data corresponding to each LED and the lighting capacity of each LED, and outputs lighting time data. A lighting mode designator determines a lighting mode for designating a timing, within one scanning period, at which each LED is caused to emit light, on the basis of image data, and outputs lighting mode designation data. A light timing controller divides one scanning period into a plurality of time intervals and supplies the lighting time data to the printer head a plurality of number of times within one scanning period at the time intervals on the basis of the lighting mode designation data, thereby selectively causing the respective LEDs to emit light.

24 Claims, 24 Drawing Sheets

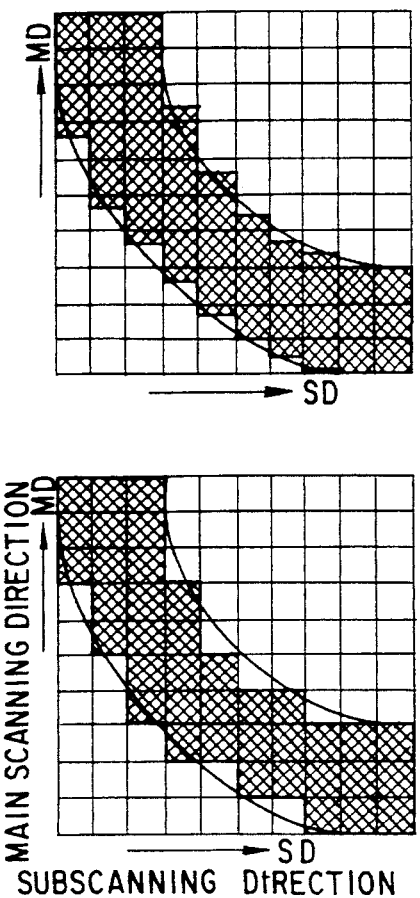
FIG. 4A
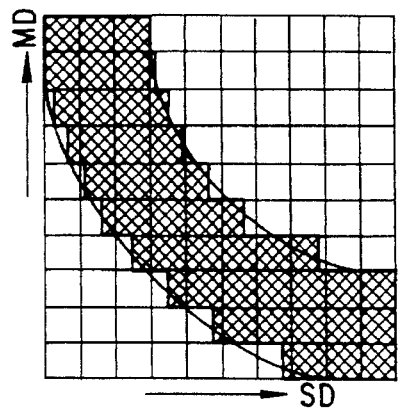
FIG. 4B
FIG. 4C
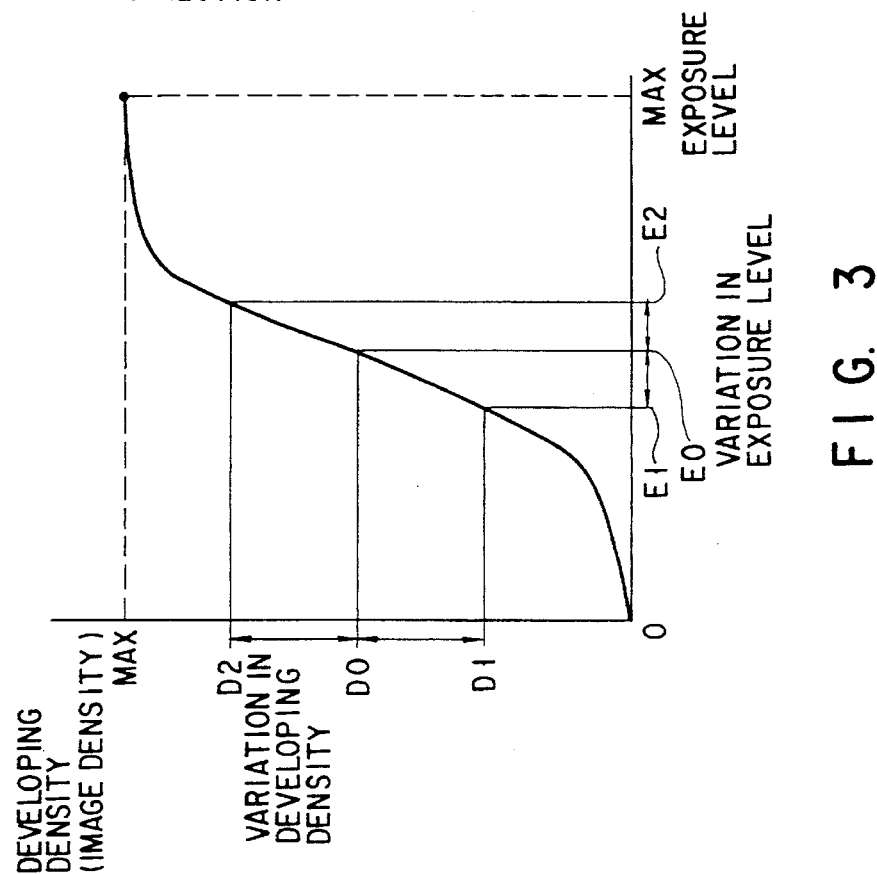
FIG. 3

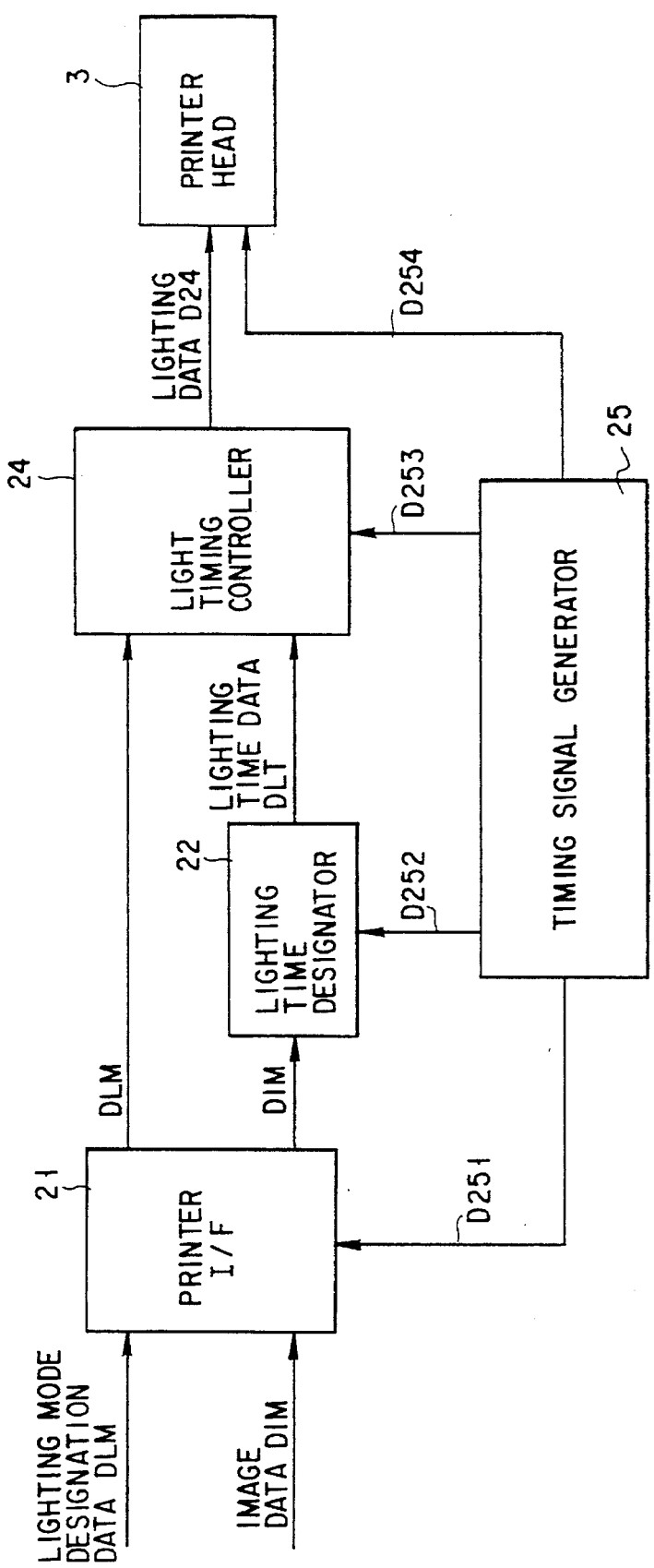
F I G. 7

| IMAGE DATA DIM | LIGHTING TIME DATA DLT | | |
|---|---|---|---|
| | −20% (80%) | ±0% (100%) | +20% (120%) |
| 0 | 0 | 0 | 0 |
| 1 | 8 | 6 | 5 |
| 2 | 16 | 13 | 11 |
| 3 | 24 | 19 | 16 |
| 4 | 32 | 26 | 21 |
| 5 | 40 | 32 | 27 |
| 6 | 48 | 38 | 32 |
| 7 | 56 | 45 | 37 |
| 8 | 64 | 51 | 43 |
| 9 | 72 | 58 | 48 |
| 10(AH) | 80 | 64 | 53 |
| 11(BH) | 88 | 70 | 59 |
| 12(CH) | 96 | 77 | 64 |
| 13(DH) | 104 | 83 | 69 |
| 14(EH) | 112 | 90 | 75 |
| 15(FH) | 120 | 96 | 80 |

FIG. 9

| ADDRESS | | DATA |
|---|---|---|
| LIGHTING POINT ADDRESS ALP (UPPER 12 BITS) | IMAGE DATA DIM (LOWER 4 BITS) | LIGHTING TIME DATA DLT (DECIMAL) |
| 0 0 1 H | 0 H | 0 |
| 0 0 1 H | 1 H | 6 |
| 0 0 1 H | 2 H | 13 |
| 0 0 1 H | 3 H | 19 |
| 0 0 1 H | 4 H | 26 |
| 0 0 1 H | 5 H | 32 |
| 0 0 1 H | 6 H | 38 |
| 0 0 1 H | 7 H | 45 |
| 0 0 1 H | 8 H | 51 |
| 0 0 1 H | 9 H | 58 |
| 0 0 1 H | A H | 64 |
| 0 0 1 H | B H | 70 |
| 0 0 1 H | C H | 77 |
| 0 0 1 H | D H | 83 |
| 0 0 1 H | E H | 90 |
| 0 0 1 H | F H | 96 |
| 0 0 2 H | 0 H | 0 |
| 0 0 2 H | 1 H | 8 |
| 0 0 2 H | 2 H | 16 |
| 0 0 2 H | 3 H | 24 |
| 0 0 2 H | 4 H | 32 |
| | | |

FIG. 10

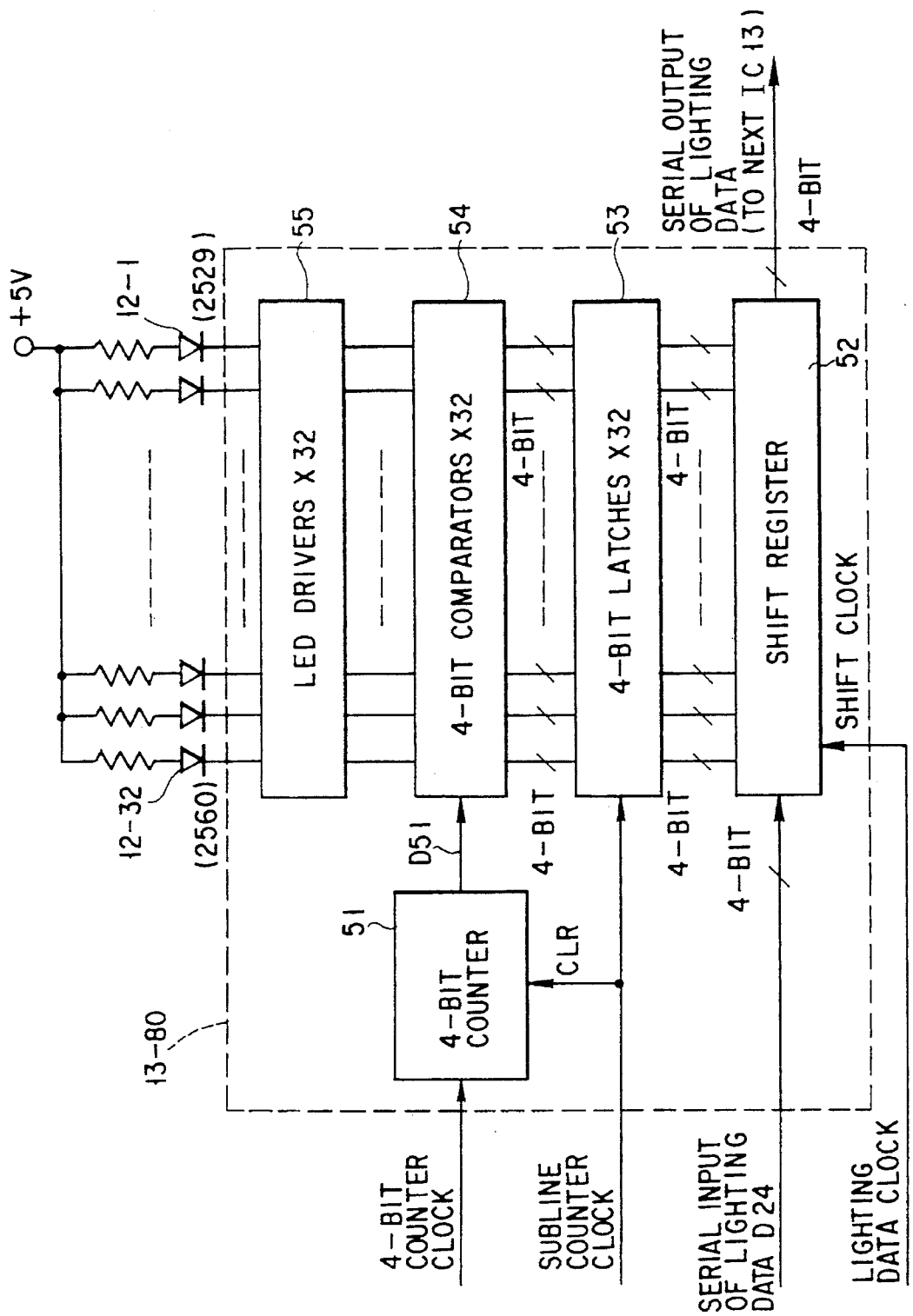
F I G. 15

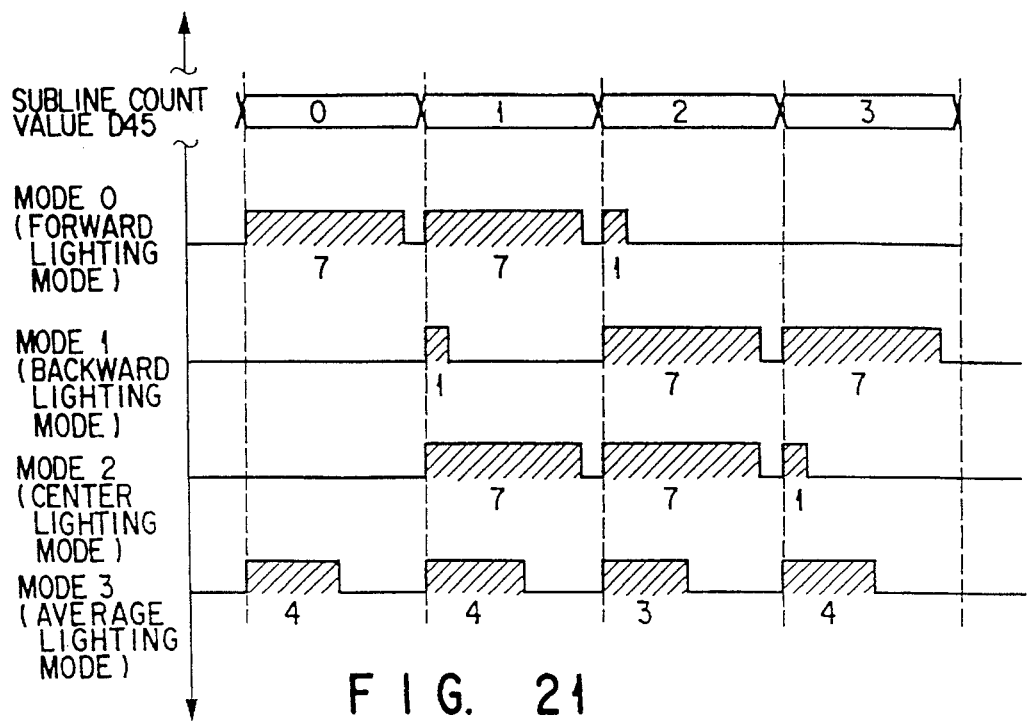
F I G. 21
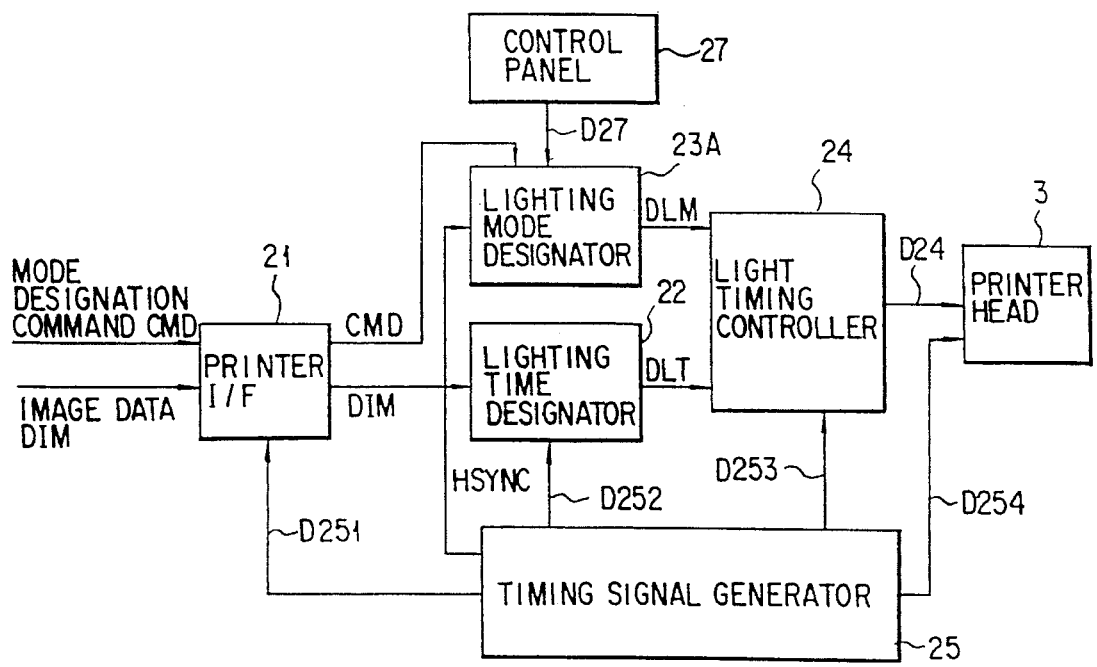
F I G. 22

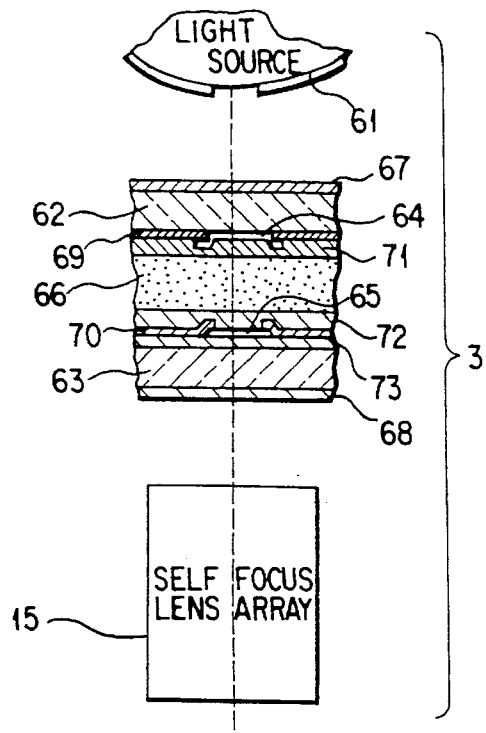
F I G. 28
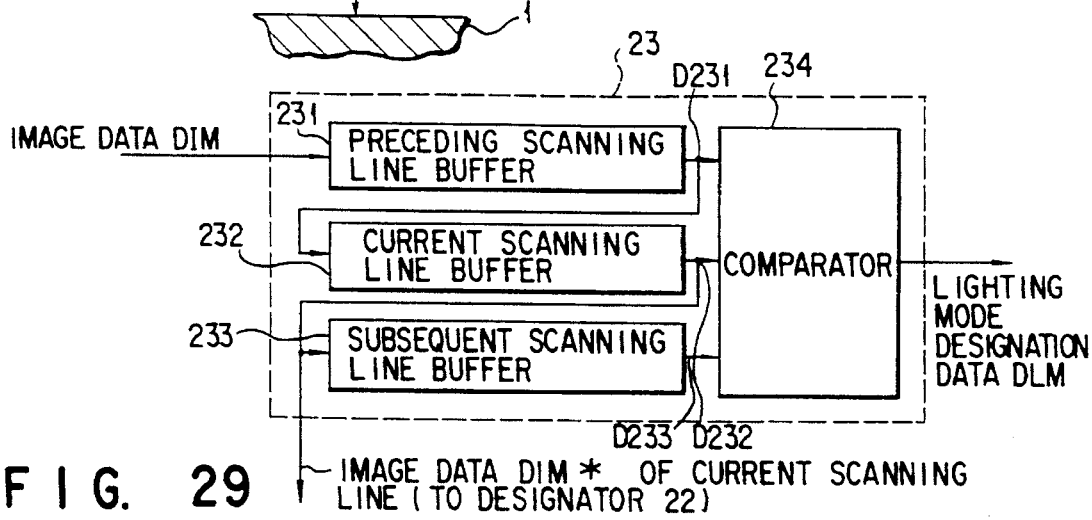
F I G. 29
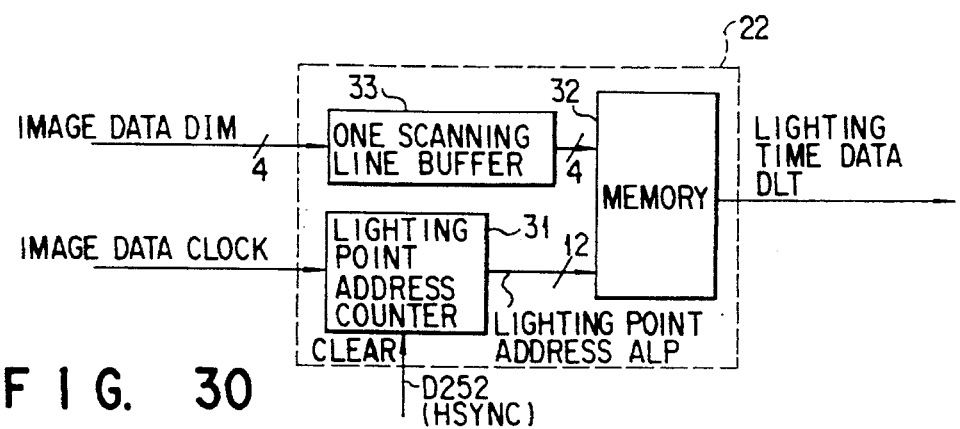
F I G. 30

PRINTER HEAD DRIVING APPARATUS IMPROVING PRINTING SPEED

BACKGROUND OF THE INVENTION

1. Field of the Invention

The present invention relates to an improvement in an apparatus for driving a solid-state scanning head (printer head) used as an exposure means in an image forming apparatus such as an electrophotographic printer, a digital copying machine, or a facsimile apparatus.

2. Description of the Related Art

In some conventional electrophotographic printer using an electrophotographic process, a printer head is used as an exposure means for forming an electrostatic latent image on a photosensitive member (image carrier) by scanning/exposing the photosensitive drum in accordance with image data to be printed.

As printer heads of this type, for example, the following heads are available: a head having an array of a large number of light-emitting elements such as LEDs (light-emitting diodes), EL (electroluminescent) elements, or phosphors and designed to selectively cause the light-emitting elements to emit light in accordance with image data; and a head having an array of a large number of optical shutters consisting of liquid crystal elements, PLZT (lead lanthanum zirconate titanate), and the like and designed to control light from a light source by selectively controlling the switching times of the optical shutters in accordance with image data.

Generally, in such a printer head constituted by a large number of light-emitting elements or optical shutters, the light-emitting elements vary in lighting intensity or the optical shutters vary in transmittance. If, therefore, gradation recording is performed by simply controlling the lighting times of the light-emitting elements or the switching times of the optical shutters of this printer head, the print result will suffer density irregularity caused by variations in lighting intensity of the light-emitting elements or variations in transmittance of the optical shutters.

For this reason, such a printer head is generally used only for a binary printer.

Recently, in a laser printer as a means for achieving high image quality, for example, the following operations have generally been performed: finely controlling the lighting time of a laser beam to perform gradation recording; and performing a smoothing process (round edge treatment: RET) to print an oblique line portion or a curved line portion smoothly.

In a printer using a printer head, however, the light timing or switching timing of each of a large number of light-emitting elements or optical shutters must be controlled. For this reason, it is very time-consuming to transfer print data to the printer head, resulting in a considerable drop in print speed of the printer.

In a method of expressing gradation by controlling the lighting time at each exposure point, a reduction in exposure area is inevitable. In this case, as the exposure area becomes smaller, developing of an electrostatic latent image becomes unstable, resulting in a deterioration in image quality of a print result.

SUMMARY OF THE INVENTION

It is the first object of the present invention to provide a printer head driving apparatus which can correct variations in lighting intensity of light-emitting elements or variations in transmittance of optical shutters, and can express gradation with no density irregularity without lowering the print speed.

It is the second object of the present invention to provide a printer head driving apparatus which can perform a round edge treatment by controlling the light timing of each light-emitting element or the switching timing of each optical shutter.

It is the third object of the present invention to provide a printer head driving apparatus which can minimize a reduction in exposure area and realize stable halftone image recording (gradation recording) by continuously exposing adjacent portions to be exposed in the subscanning direction (the moving direction of a surface to be exposed).

In a printer head driving apparatus of the present invention, a lighting section is lighted in accordance with image data so that a solid-state scanning head scans an exposure surface. This apparatus includes: a first determining section for determining a first lighting period of the lighting section within one scanning time period in accordance with the image data, so as to provide a first information representing the determined first lighting period; a first dividing section for dividing the one scanning time period by a number m so as to provide a second information representing the divided scanning time periods, the number m being an integer larger than 1; a second determining section for determining a second lighting period of the lighting section within one of the divided scanning time periods, in accordance with the first information provided by the first determining section and the second information provided by the first dividing section, so as to provide a third information representing the determined second lighting period; a second dividing section for further dividing the one of the divided scanning time periods by a number n so as to provide a fourth information representing the further divided scanning time periods, the number n being an integer larger than 1; and a controlling section for controlling lighting operation of the lighting section in accordance with the third information provided by the second determining section and the fourth information provided by the second dividing section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a graph showing the relationship between the exposure level and the developing density (image density);

FIGS. 4A to 4C are charts for explaining the concept of a round edge treatment, in which FIG. 4A shows a curve expressed without performing a round edge treatment, FIG. 4B shows a curve expressed with a round edge treatment being performed in the main scanning direction, and FIG. 4C shows a curve expressed with a round edge treatment being performed in the subscanning direction by the printer head;

FIG. 7 is a block diagram showing another processing circuit for realizing a driving method for printer head 3;

FIG. 9 is a table showing the correspondence between image data and lighting time data;

FIG. 10 is a table for explaining the contents stored in a memory incorporated in lighting time designator 22;

FIG. 15 is a block diagram showing the internal arrangement of a driving IC chip incorporated in printer head 3;

FIG. 21 is a timing chart for explaining another example of how different light timings are set in different lighting modes;

FIG. 22 is a block diagram showing still another processing circuit for realizing a driving method for printer head 3;

FIG. 28 is a sectional view for explaining a printer head using a liquid crystal shutter array as light-emitting portions;

FIG. 29 is a block diagram showing the internal arrangement of a lighting mode designator;

FIG. 30 is a block diagram showing the internal arrangement of a lighting time designator used together with the lighting mode designator shown in FIG. 29.

DETAILED DESCRIPTION OF THE PREFERRED EMBODIMENTS

Embodiments of the present invention will be described below with reference to the accompanying drawings.

Figure 1:
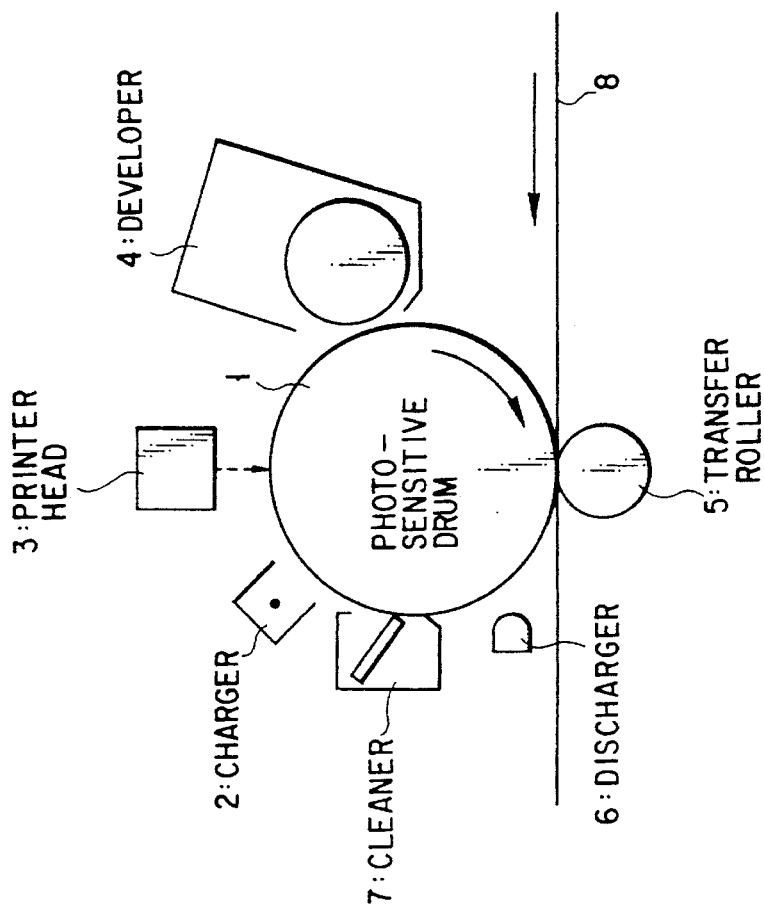
FIG. 1 is a schematic view showing the arrangement of the image forming section of an electrophotographic printer using a printer head according to an embodiment of the present invention.

FIG. 1 schematically shows the image forming section of an electrophotographic printer in which a printer head according to the present invention is used as an exposure means. Referring to FIG. 1, reference numeral 1 denotes a photosensitive drum as an image carrier. Photosensitive drum 1 is rotated at a constant speed in the direction indicated by an arrow in FIG. 1. Charger 2, printer head 3, developer 4, transfer roller 5, discharger 6, and cleaner 7 are arranged around photosensitive drum 1 along its rotational direction in the order named.

when an image is to be formed, photosensitive drum 1 is rotated, and its surface is uniformly charged by charger 2. Printer head 3 has a large number of light-emitting portions (e.g., light-emitting elements or optical shutters) arranged one-dimensionally or two-dimensionally. The light-emitting portions of printer head 3 selectively emit light or transmit light in accordance with image data supplied from a scanner (not shown) or an external unit. The light is then focused by a lens to scan/expose charged photosensitive drum 1.

With this exposure operation, the potential of each surface portion, of photosensitive drum 1, which is irradiated with the light changes to form an electrostatic latent image corresponding to the image data. When this electrostatic latent image formed on photosensitive drum 1 passes by developer 4, toner particles are attracted to the latent image to develop the image, thus forming a visual image.

By this time, a transfer paper sheet (not shown) has been conveyed from a paper feed section (not shown) to transfer roller 5 by transfer belt 8. The visual image (toner image) developed on photosensitive drum 1 by developer 4 is transferred onto the transfer paper sheet by transfer roller 5. The transfer paper sheet on which the toner image is transferred is conveyed to a fixing section (not shown). The toner image on the transfer paper sheet is then heated and pressurized to be firmly fixed on the transfer paper sheet.

After the transfer operation, photosensitive drum 1 is discharged by discharger 6. Thereafter, the toner particles which are left on photosensitive drum 1 without being transferred are cleaned by cleaner 7, and the cleaned surface reaches charger 2 again.

The electrophotographic printer repeats the above-described process to continuously perform print operations.

Figure 2:
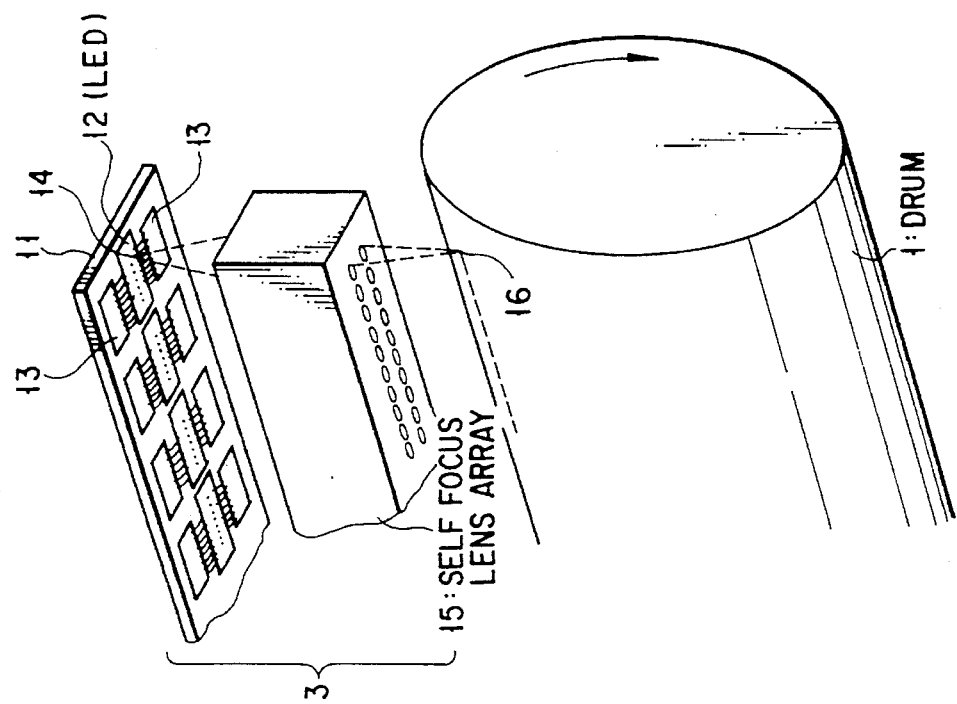
FIG. 2 is a schematic perspective view showing the positional relationship between printer head 3 and photosensitive drum 1.

FIG. 2 shows the arrangement of printer head 3 using LEDs (light-emitting diodes) as light-emitting elements, and the relative positional relationship between printer head 3 and photosensitive drum 1. More specifically, printer head 3 comprises ceramic substrate 11, a large number of LED chips 12 arranged on ceramic substrate 11 to be parallel to the rotational axis of photosensitive drum 1, a large number of driving IC chips 13 arranged on ceramic substrate 11 and designed to drive LED chips 12, and self focus lens array 15 for focusing light from each lighting point 14 of each LED chip 12 to guide the light onto photosensitive drum 1.

LED chips 12 on ceramic substrate 11 are arranged such that lighting points 14 are arranged at an equal pitch on a straight line extending along the rotational axis of photosensitive drum 1. In this embodiment, for example, this pitch is set to be 84.7 μm (corresponding to 300 DPI (dot-per-inch)). Driving IC chips 13 are arranged on both sides of each LED chip 12. Each LED chip 12 and IC chips 13 are electrically connected to each other by wire bonding.

Light from each lighting point 14 of each LED chip 12 is focused by self focus lens array 15 to expose the surface of the photosensitive drum 1. Therefore, exposure points 16 on photosensitive drum 1 are arranged at the same pitch of lighting points 14 of LED chips 12, i.e., 84.7 μm (corresponding to 300 DPI) in a direction perpendicular to the moving direction (rotational direction) of photosensitive drum 1.

Variations in lighting level of a large amount of light-emitting elements (LED chips 12) constituting a printer head and the influence of the variations will be described below. As described above, as printer heads of this type, for example, the following heads are available: a head having an array of a large number of light-emitting elements such as LEDs (light-emitting diodes), EL (electroluminescent) elements, or phosphors and designed to selectively cause the light-emitting elements to emit light in accordance with image data; and a head having an array of a large number of optical shutters consisting of liquid crystal elements, PLZT (lead lanthanum zirconate titanate), and the like and designed to control light from a light source by selectively controlling the switching times of the optical shutters in accordance with image data.

In such a printer head constituted by a large number of light-emitting elements or optical shutters, the light-emitting elements vary in lighting intensity or the optical shutters vary in transmittance. The variations are generally about ±20% with respect to a nominal value. If, therefore, gradation recording is performed by simply controlling the lighting times of the light-emitting elements or the switching times of the optical shutters of this printer head, the print result will suffer density irregularity caused by the variations in lighting intensity of the light-emitting elements or variations in transmittance of the optical shutters.

The degree of this density irregularity depends on developing characteristics. In general, the relationship between exposure level and developing density (image density) exhibits gamma characteristics and hence is not a linear relationship. FIG. 3 is a graph indicating this relationship. In this graph, the abscissa indicates the exposure level (lighting level); and the ordinate, the developing density (image density). No specific units are set for the two axes. As is apparent from this graph, the changes in developing density in a low-exposure-level region and a high-exposure-level region are relatively small, whereas the change in developing density in an intermediate-exposure-level region is large.

If, therefore, the lighting level of the printer head varies owing to the light-emitting elements or the optical shutters, especially the variations in developing density (image density) (i.e., density irregularity) in the intermediate-exposure-level region become conspicuous. If, for example, halftones are expressed by printer head 3 having a ±20% variation in exposure level (E1 to E2) with respect to a nominal value E0, a density variation (density irregularity) of ±30% or more (D1 to D2) with respect to a reference value D0 appears on a print output image in the graph shown in FIG. 3. That is, when halftones are to be expressed by using printer head 3, variations in exposure level based on the lighting level of printer head 3 need to be minimized.

A round edge treatment will be briefly described next. FIGS. 4A to 4C are graphs for explaining the effect of a round edge treatment. In these graphs, one square corresponds to one LED lighting point. FIG. 4A shows a case wherein a curved line is drawn by a general binary printer. In this case, as shown in FIG. 4A, since the curved line is expressed in units of dots, a smooth curved line cannot be expressed.

FIG. 4B shows a case wherein a round edge treatment is performed in a laser printer. In this case, a laser beam is scanned from the left to the right (in the main scanning direction). In such a laser printer, the dot position can be shifted in main scanning direction MD by controlling the exposure time and exposure timing of a laser beam with respect to one print dot. With this operation, a halftone can be expressed within one dot, thus obtaining a smoother curved line.

FIG. 4C shows a case wherein a round edge treatment is performed by using printer head 3. In this case, unlike the case shown in FIG. 4B, a round edge treatment is performed by shifting the dot position in subscanning direction SD. The lighting point of printer head 3 cannot be moved in the main scanning direction. For this reason, when the lighting time and light timing of each light-emitting element or the switching time and switching timing of each optical shutter are controlled, a dot shift occurs in subscanning direction SD.

As described, in the use of the printer head, a round edge treatment can also be performed.

A printer head driving method which can simultaneously perform correction of variations in lighting level (exposure level) and a round edge treatment will be described next.

Figure 5:
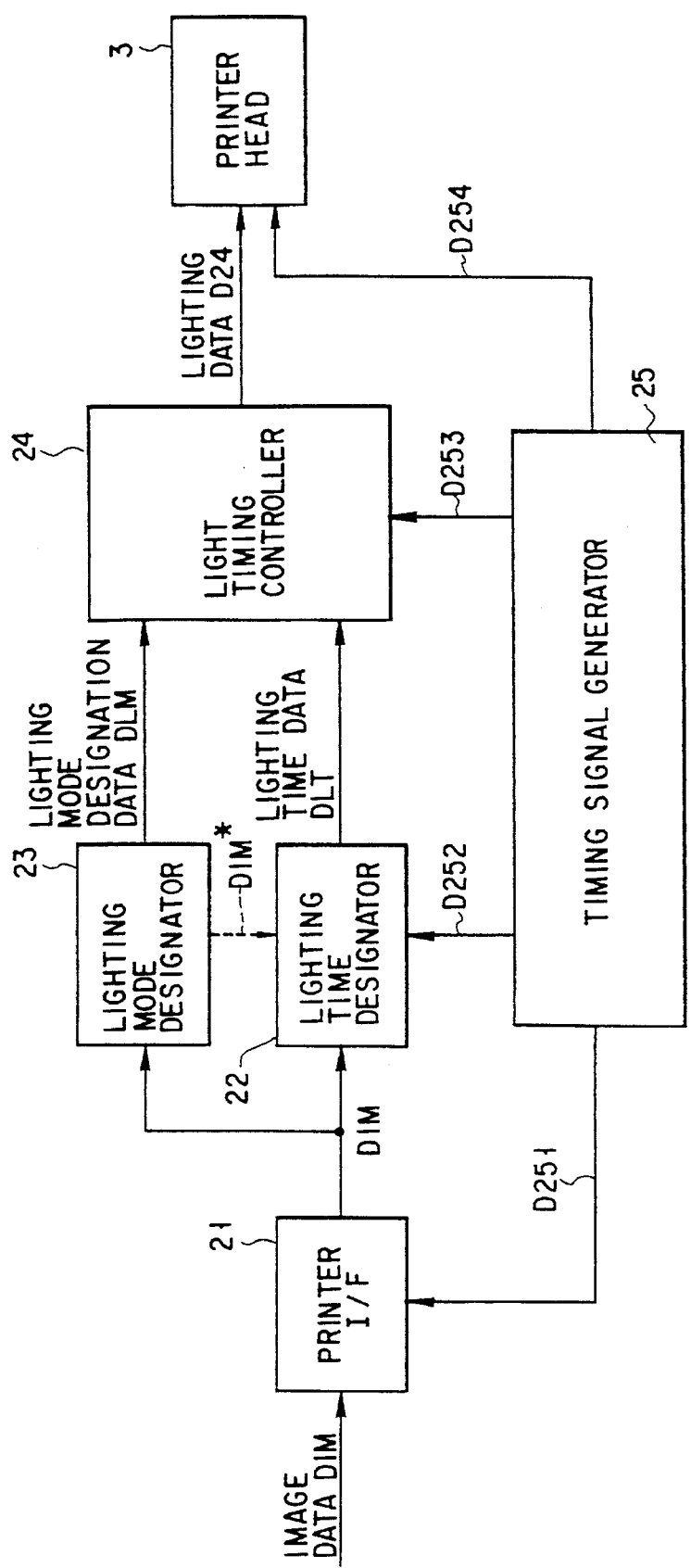
FIG. 5 is a block diagram showing a processing circuit for realizing a driving method for printer head 3 according to the embodiment of the present invention.

FIG. 5 is a block diagram showing a processing circuit for realizing the driving method of this embodiment. As shown in FIG. 5, this processing circuit comprises printer interface 21, lighting time designator 22, lighting mode designator 23, light timing controller 24, and timing signal generator 25 for supplying various timing signals to these components. The functions of the respective main components will be described below.

Lighting time designator 22 converts image data DIM, supplied through printer interface 21, into lighting time data DCT in accordance with the lighting intensity of each light-emitting element for performing exposure or the transmittance of each optical shutter (i.e., the lighting capacity of each light-emitting portion). In the case of printer head 3 used in the embodiment, since the number of lighting points (LEDs) 14 is 2,560, lighting time designator 22 outputs lighting time data suitable for the respective lighting points 14 to the 2,560 lighting points 14 in one scanning period.

Figure 6:
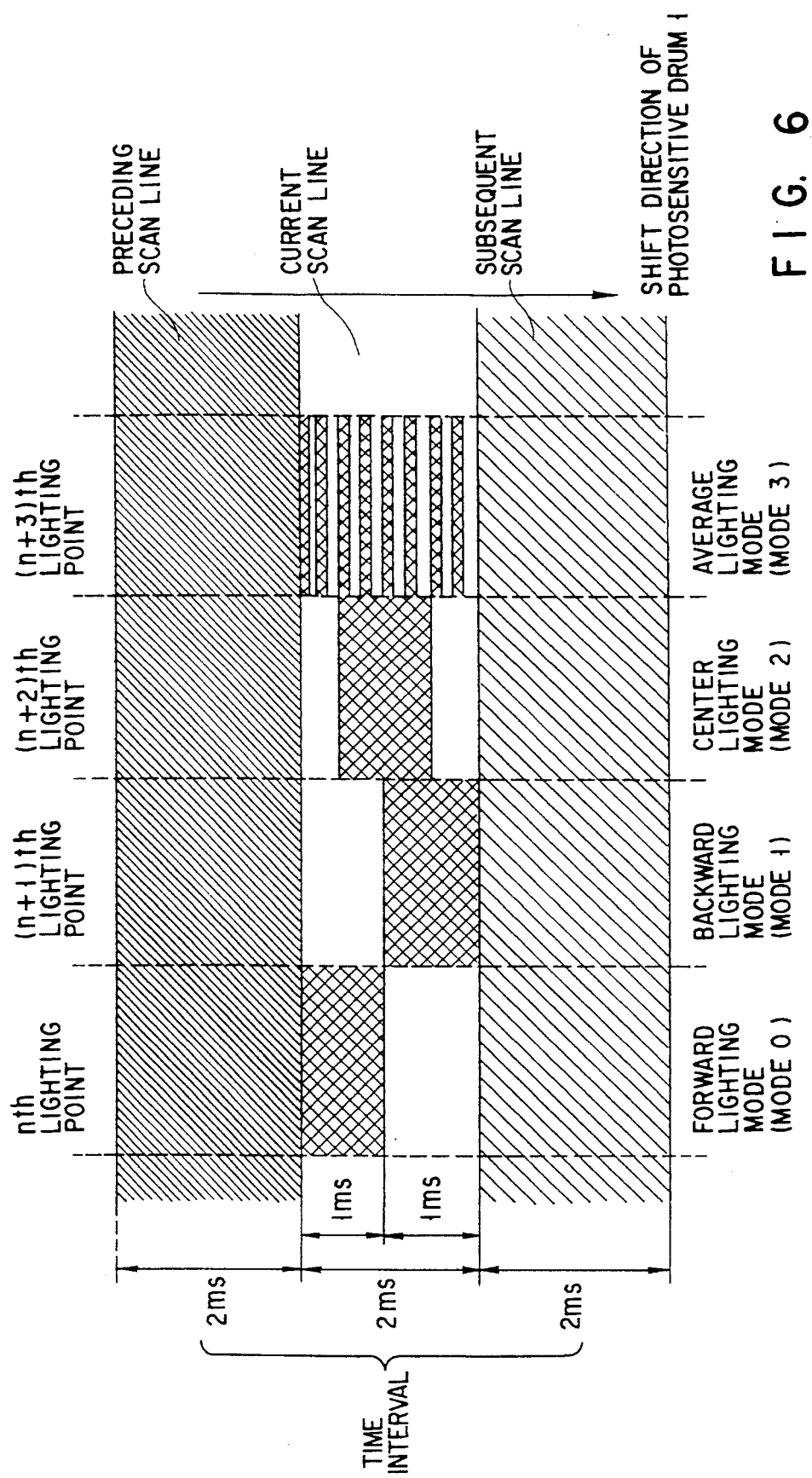
FIG. 6 is a chart for explaining four lighting modes used in the embodiment of the present invention.

Lighting modes will be defined with reference to FIG. 6. FIG. 6 is a chart showing the differences in lighting pattern between lighting modes (MODE 0 to MODE 3) in a case wherein one scanning period is 2 ms, and a lighting time at a given lighting point (nth, (n+1)th, (n+2)th, or (n+3)th lighting point) is 1 ms (50% of one scanning period).

Referring to FIG. 6, in order to clarify relative light timings, three scanning lines, i.e., a preceding scanning line, a current scanning line, and a subsequent scanning line, are shown, and light timings, at the current scanning line, based on the differences in lighting mode are expressed by cross-hatching. The moving direction (subscanning direction) of photosensitive drum 1 corresponds to the vertical direction, and the direction in which the lighting points (exposure points) are arranged corresponds to the lateral direction.

As is apparent from FIG. 6, this lighting mode designation data designates a specific timing at which a lighting operation corresponding to 1 ms is performed in one scanning period of 2 ms. FIG. 6 shows how lighting is performed in the respective designated modes: a forward lighting mode (MODE 0) in which the nth lighting point emits light along the preceding scanning line; a backward lighting mode (MODE 1) in which the (n+1)th lighting point emits light along the subsequent scanning line; a center lighting mode (MODE 2) in which the (n+2)th lighting point emits light in the middle of the current scanning line; and an average lighting mode (MODE 3) in which the (n+3)th lighting point intermittently emits light at equal intervals within the current scanning line. The total lighting time in each mode is 1 ms.

Lighting mode designator 23 is a means for designating a specific mode to be used, of lighting modes (MODE 0 to 3) described above, for each image data DIM. Lighting mode designator 23 incorporates a line memory for storing image data corresponding to a plurality of lines so that image data around a current lighting point can be referred. For example, a current lighting point is arranged at the center of a 3×3 or 5×5 matrix, and a lighting mode for the current lighting point is designated on the basis of the distribution of image data around the current lighting point.

FIG. 29 is a block diagram showing a detailed arrangement of lighting mode designator 23. As shown in FIG. 29, lighting mode designator 23 incorporates line buffers 231 to 233 corresponding to three scanning lines and comparator 234 for comparing image data D231 to D233 from these three line buffers.

Image data DIM(1) from printer I/F 21 shown in FIG. 5 is input to preceding scanning line buffer 231. When image data DIM(2) of the next line is input to preceding scanning line buffer 231, image data DIM(1) is input to current scanning line buffer 232. When image data DIM(3) of the still next line is input to preceding scanning line buffer 231, image data DIM(1) is input to subsequent scanning line buffer 233.

Meanwhile, comparator 234 receives three types of image data (the data of the preceding scanning line, the current scanning line, the subsequent scanning line) corresponding to the same lighting point 14 of printer head 3 from line buffers 231 to 233. Comparator 234 compares the image data (image density) of the preceding scanning line, the current scanning line, and the subsequent scanning line with each other to designate one of the lighting modes (MODE 0 to MODE 3 in FIGS. 6, 12, and 13) for the current scanning line. For example, this designation is based on the following rule indicated by Table 1.

TABLE 1

| Comparison Result of Image Data (Image Density) | Lighting Mode Designation Data DLM |
| --- | --- |
| preceding > subsequent (current ≠ max.) | forward lighting mode (MODE 0) |
| preceding < subsequent (current ≠ max.) | backward lighting mode (MODE 1) |
| current = max. | center lighting mode (MODE 2) |
| preceding = subsequent (current ≠ max.) | average lighting mode (MODE 3) |

By comparing the image density of a current dot (to be printed) with that of adjacent dots in the subscanning direction in this manner, one of the lighting modes (0 to 3) can be designated.

With this method, when a line image such as a character is to be drawn, a smooth curved line such as the one shown in FIG. 4C can be expressed. In addition, when a halftone image is to be drawn, stable halftone image data can be output by changing the contents of Table 1 (i.e., changing the manner of applying a specific lighting mode to a specific comparison result) in accordance with the characteristics of the printing mechanism of the printer.

In the use of the arrangement shown in FIG. 29, lighting mode designation data DLM output from lighting mode designator 23 is delayed by one line with respect to image data DIM input from printer I/F 21 (because of the use of line buffer 233). In this case, therefore, as shown in FIG. 30, line buffer 33 is also arranged in lighting time designator 22 to simultaneously input lighting mode designation data DLM and lighting time data DLT, which are in phase, to light timing controller 24.

The following is an example of a typical process associated with the above-described lighting mode designation. If the values (densities) of image data around a current lighting point on a current scanning line are almost equal to each other, it is determined that the corresponding pixel is a halftone pixel, and the average lighting mode (MODE 3) in which the lighting position is not shifted is designated. If the values of image data at upper and lower positions (subscanning direction) greatly differ from each other, it is determined that the corresponding pixel is part of a line image such as a character, and the light timing is shifted toward the image data having a larger value (higher lighting level). If, for example, the image data of the preceding scanning line is considerably larger (higher in exposure level) than the image of the subsequent scanning line, the forward k mode (MODE 0) is designated. In contrast to this, if the image data of the preceding scanning line is considerably smaller than the image of the subsequent scanning line, the backward lighting mode (MODE 1) is designated. In addition, if the values of the adjacent image data are smaller than the value of the current image data, it is determined that the current lighting point is an isolated point, and the center lighting mode (MODE 2) is designated.

Note that such a lighting mode designation function (lighting mode designator 23) need not always be incorporated in the printer, and such a process may be performed outside the printer (for example, in an external unit such as a wordprocessor or a computer) to transmit lighting mode designation data to the printer together with image data DIM. FIG. 7 is a block diagram showing a processing circuit having such an arrangement. Referring to FIG. 7, printer interface (including buffers for lighting mode designation data DLM and image data DIM) 21 can receive both image data DIM from an external unit (e.g., a computer) and lighting mode designation data DLM.

Light timing controller 24 controls the light timing of each lighting point 14 of printer head 3 on the basis of lighting time data DLT and lighting mode designation data DLM.

The following is a method of controlling the light timing. Lighting corresponding to lighting time data for one scanning operation is performed by scanning a plurality of number of times. That is, one scanning operation is divided into a plurality of scanning operations (subline scanning operations) each having a short scanning time, and lighting/non-lighting is designated for each scanning operation.

Assume that 7-bit multi-value information is set as lighting time data. In this case, there are 128 types of lighting times. When one scanning operation is divided into 127 subline scanning operations, and one scanning operation is constituted by 127 subline scanning operations, 128 types of lighting times can be realized. That is, a lighting point with lighting time data "0" does not emit light even once in 127 subline scanning operations, and hence the lighting time of this point is set to be "0".

A lighting point with lighting time data "127" emits light in all the 127 subline scanning operations, and hence can light for the entire period of time assigned to one scanning operation. With lighting time data other than "0" and "127", lighting may be performed the number of times, of 127 subline scanning operations, corresponding to the lighting time data in accordance with lighting mode designation data.

Although such a control method can be performed with a simple arrangement, the method has a drawback of low print speed. More specifically, in the abovedescribed method, since 127 binary data (lighting data and non-lighting data) must be transferred to printer head 3 for each scanning operation, it takes much time to transfer data. In this case, the print speed may be simply calculated as follows. Provided that the resolution is 300 dpi; the paper size, A4; and the transfer speed of binary data, about 10 MHz, the time required for data transfer corresponding to 2,560 points (a print length of about 216 mm) is 256 µs. In addition, since data corresponding to 127 lines are required, the time required for one scanning operation is 32 ms or more. That is, the printer speed is decreased to about 2.6 mm/s.

In this embodiment, in order to solve the problem of low speed, one scanning period is divided into eight time intervals, and lighting time data (four bits) of each of the eight scanning times is transferred to printer head 3 eight times. With this operation, the number of times of data transfer is reduced from 127 to 8 (a detailed arrangement will be described later with reference FIG. 11). By reducing the number of times of data transfer to 8/127 ($\cong$1/16) in this manner, the print speed can be increased 16 times.

In addition, the use of a plurality of data transfer lines to printer head 3 will achieve a higher print speed. If, for example, lighting time data for odd lighting points and lighting data for even lighting points are transferred through different transfer lines (parallel two lines), the time required for data transfer can be reduced to ½ (a detailed arrangement will be describe later with reference to FIG. 31).

A printer head driving method which can simultaneously perform correction of variations in lighting level and a round edge treatment has been briefly described above. Each means for realizing this method will be described further in detail next.

In the following embodiment, the above-described four lighting modes can be designated with respect to printer head 3 having 2,560 lighting points 14, variations in the lighting level of printer head 3 can be corrected, and gradation exposure of 16 gradation levels can be performed. In this case, 4-bit digital data is input as image data DIM.

Figure 8:
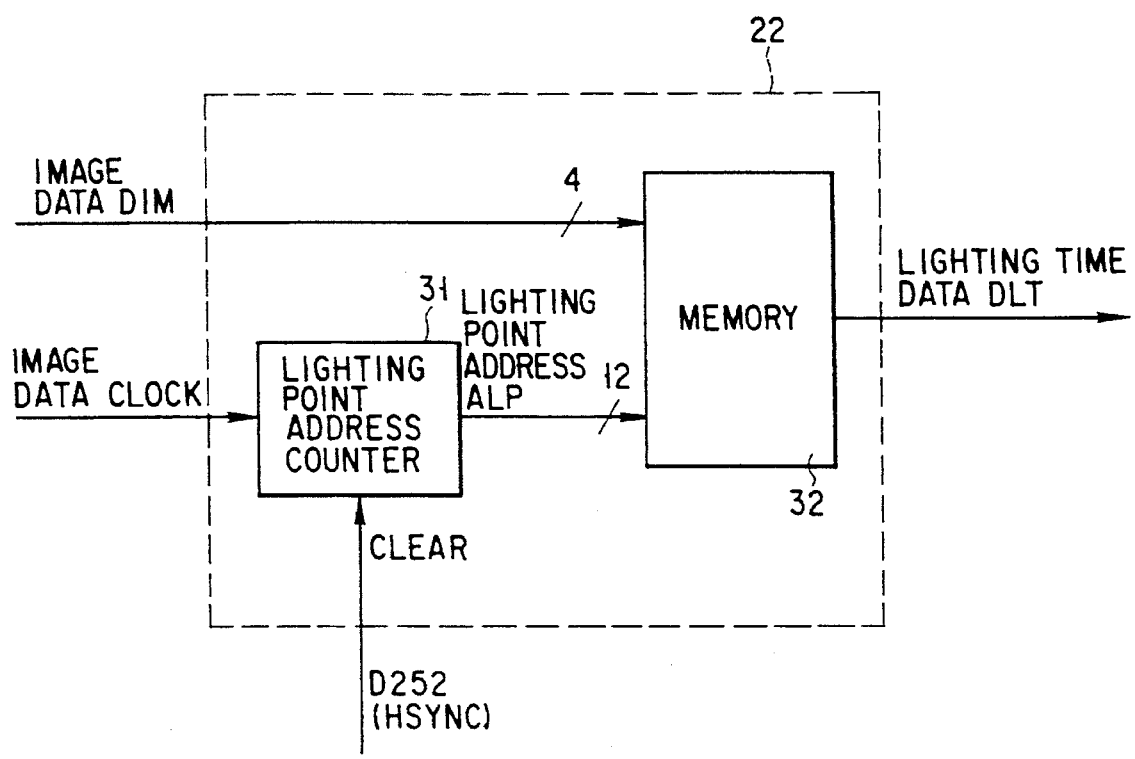
FIG. 8 is a block diagram showing the internal arrangement of lighting time designator 22.

FIG. 8 shows the arrangement of lighting time designator 22 shown in the block diagrams of FIGS. 5 and 7. As shown in FIG. 8, lighting time designator 22 comprises lighting point address counter 31 and memory 32. Four-bit image data DIM, an image clock synchronized with image data DIM, and an HSYNC signal (timing signal D252) are input to lighting time designator 22.

Figure 16:
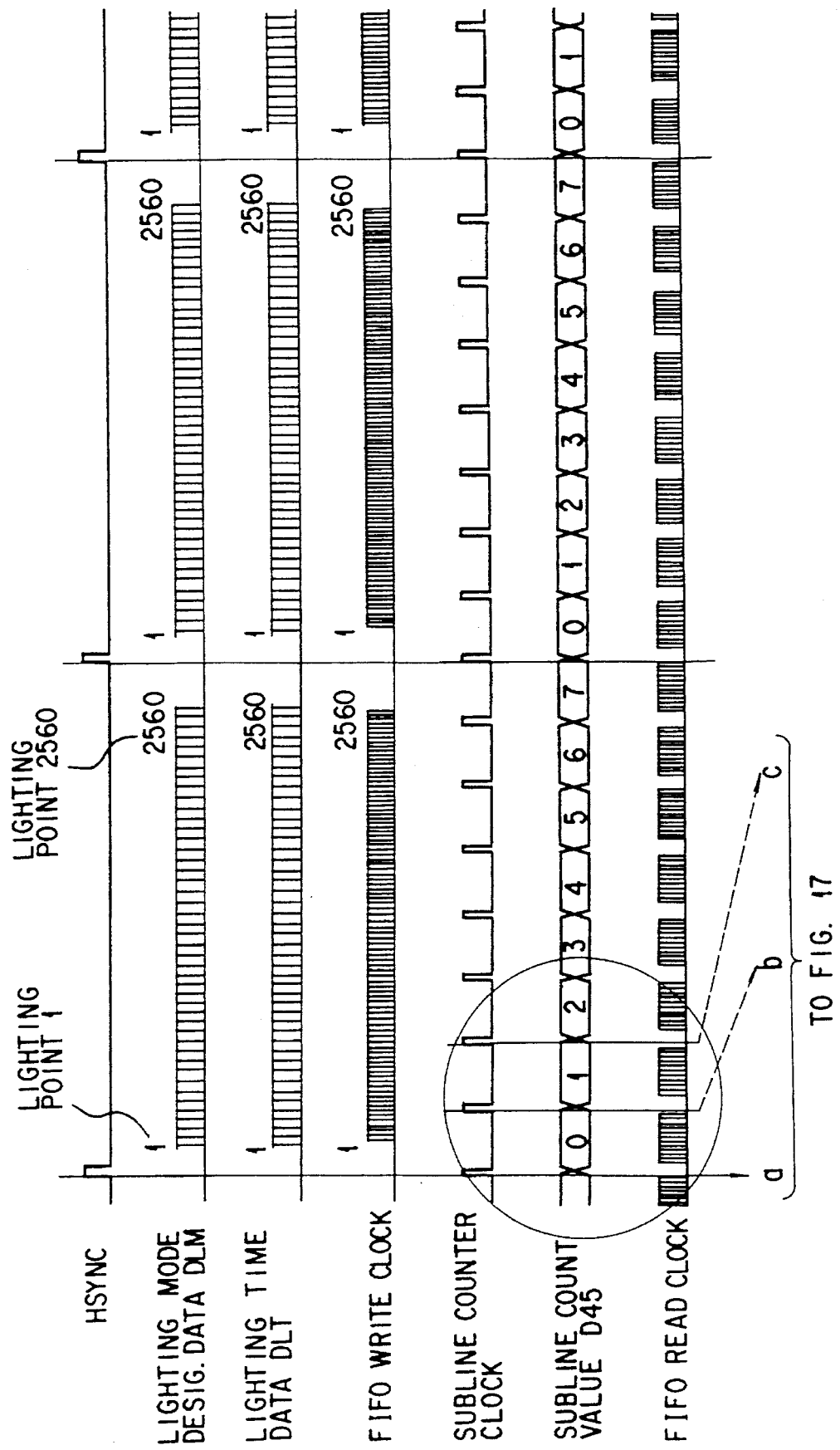
FIG. 16 is a timing chart for explaining an example of the lighting operation of printer head 3.
Figure 17:
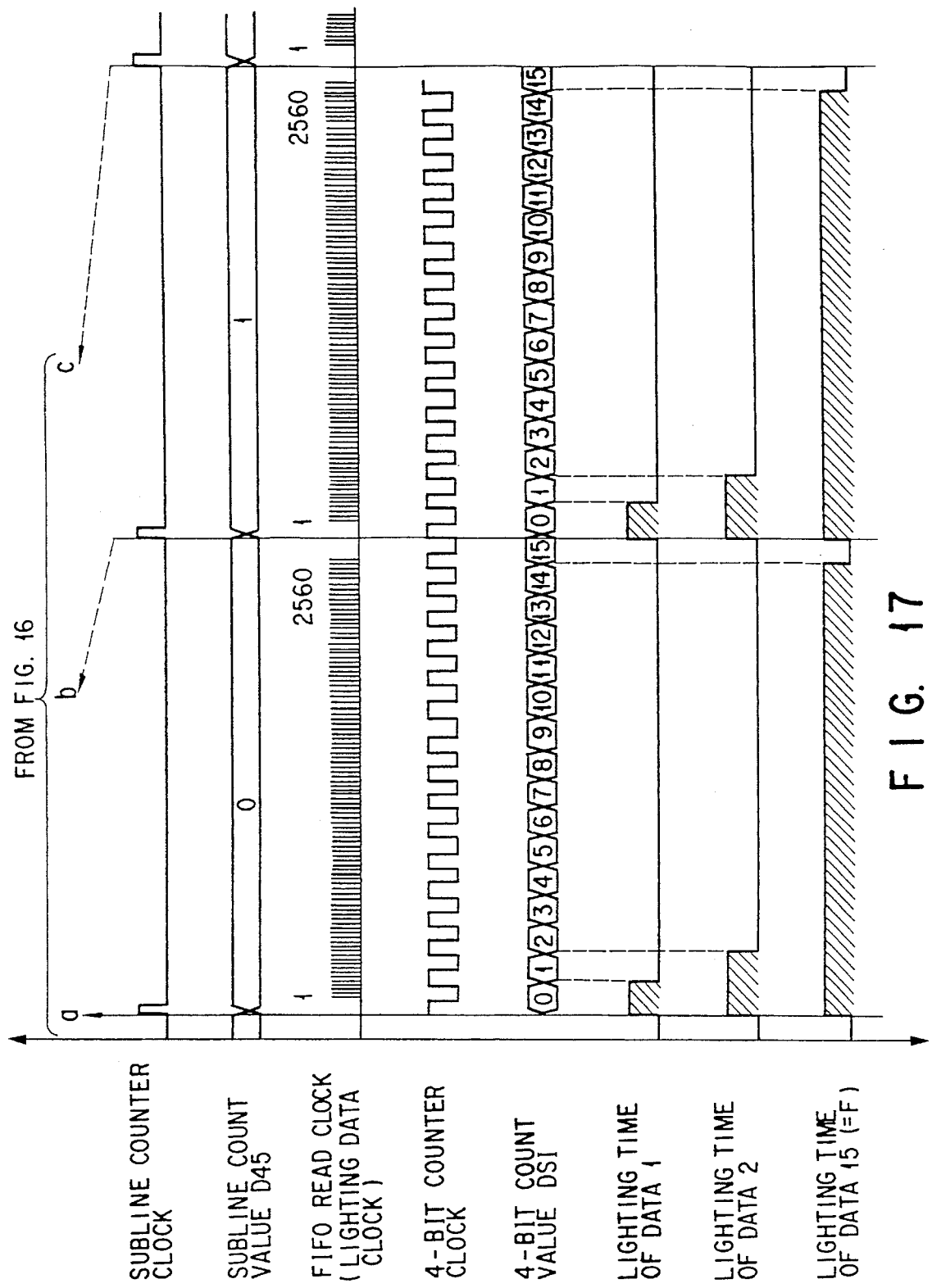
FIG. 17 is a timing chart showing part of a lighting operation in FIG. 16 in detail.

As shown in the timing charts of FIGS. 16 and 17, image data DIM and image clocks corresponding to 2,560 pixels are output during one period of the HSYNC signal. Note that the HSYNC signal is a horizontal sync signal supplied prior to the transfer of image data for one scanning operation.

Lighting point address counter 31 is cleared first by this HSYNC signal, and its output value ALP is set to "0". When the transfer of image data DIM is started, lighting point address counter 31 starts to count image clocks. That is, count value ALP of lighting point address counter 31 indicates a specific lighting point to which currently transferred image data DIM corresponds.

In the embodiment shown in FIG. 8, when the transfer of image data DIM for one scanning operation is completed, count value ALP of lighting point address counter 31 is "2,560". Before the transfer of image data DIM for the next scanning line is started, HSYNC signal D252 is input from timing signal generator 25 to lighting point address counter 31 to clear counter 31. Lighting point address counter 31 then starts to count from "0" to "2,560" again (address counts 0 to 2,560 can be covered by a 12-bit counter).

Four-bit image data DIM and 12-bit memory address ALP output from lighting point address counter 31 are input to memory 32 having 16 bit address inputs. In this case, image data DIM is assigned to the lower four bits of the 16 bit address inputs of memory 32, whereas the output from lighting point address counter 31 is assigned to the upper 12 bits. For example, when first image data DIM is transferred, since count value ALP of lighting point address counter 31 is set to "1", the address of the upper 12 bits is "001"H ("H" indicates "hexadecimal"). If the value of image data DIM is "0"H, the address of the lower four bits becomes "0"H. As a result, the contents (lighting time data DLT) at address "0010"H are output from memory 32. If the value of image data DIM is "1"H, the contents (DLT) at address "0011"H are output.

That is, with respect to first image data DIM, the data at one of addresses "0010"H to "0010F"H is output in accordance with the value ("0"H to "F"H) of image data DIM (upper address ALP is fixed to "001"H).

Similarly, with respect to second image data DIM, the data at one of addresses "0020"H to "002F"H is output (address ALP is fixed to "002"H). One of addresses "A000"H to "A00F"H corresponds to the last image data, i.e., the 2,560th image data (address ALP is fixed to "A00"H).

Lighting time data DLT written in memory 32 shown in FIG. 8 will be described next with reference to FIG. 9. Lighting time data DLT is obtained by measuring the lighting level of printer head 3 at each lighting point in advance, and has a value with which the variation in lighting intensity is minimized. Providing that there is a 20% variation in the lighting level of printer head 3, a method of creating lighting time data for typical lighting points with 120%, 100%, and 80% lighting levels will be described below. Assume that lighting time data to be obtained ranges from "0" (non-lighting) to "120" ("78"H: full lighting).

With respect to a lighting point with the minimum lighting intensity (80%) , lighting time data are uniformly assigned to image data DIM="0" to "15" ("F"H). That is, with respect to image data "0", lighting time data DLT is also set to "0". With respect to image data "15" ("F"H) (see the lowest row in the table shown in FIG. 9), lighting time data DLT "120" ("78"H) for performing "full lighting" is assigned. With regard to image data "1" to image data "14" ("E"H), lighting times are obtained by proportional calculations, and "8" to "112" ("70"H) are assigned, respectively.

A method of obtaining lighting time data with respect to the lighting point having an average lighting intensity (100%) will be described next. When image data DIM is "0", lighting time data DLT is also "0". When image data DIM is "15" ("F"H) (see the lowest row of the table shown in FIG. 9), lighting time data DLT needs to match the lighting level (DLT=120) obtained when a lighting point with the minimum lighting intensity performs "full lighting". That is, the lighting time of a lighting point having 100% lighting intensity must be decreased to 80%. Therefore, lighting time data DLT is given as follows:

$$120 \times (80/100) = 96$$

With respect to other image data DIM="1" to "14", similar calculations may be performed.

A method of obtaining lighting time data with respect to a lighting point with the maximum lighting intensity (120%) will be described next. When image data DIM is "0", lighting time data DLT is also "0". When image data DIM is "15" ("F"H) (see the lowest row of the table shown in FIG. 9), the lighting time is shortened to match the lighting intensity obtained when a lighting point with the minimum lighting intensity performs "full lighting". Since the lighting intensity ratio is 80/120, the lighting time data is given as follows:

$$120 \times (80/120) = 80$$

The table in FIG. 9 shows the data obtained in this manner with respect to image data DIM="0" to "15". In this case, only three points with 80%, 100%, and 120% lighting intensities are exemplified. In practice, however, the lighting intensities of all the lighting points (for example, five points with 80%, 90%, 100%, 110%, and 120% lighting intensities) are measured, and proper lighting time data DLT are respectively written at addresses (see the column of image data DIM in FIG. 9) corresponding to the respective lighting points on the basis of the measurement results.

FIG. 10 is a table showing the relationship between the addresses of memory 32 and the data created in this manner. In this case, the first lighting point (upper address "001"H) is a lighting point with an average lighting intensity (see the column of "100%" in the table shown in FIG. 9), and the second lighting point (upper address "002"H) is a lighting point with the minimum lighting level (see the column of "80%" in the table shown in FIG. 9).

As is apparent from the table in FIG. 10, when lighting point address counter 31 in FIG. 8 outputs count value ALP="1", values "0" to "96" (lighting time data DLT) can be output in accordance with the value of image data DIM with respect to the first lighting point (upper address "001"H; lower addresses "0"H to "F"H). When lighting point address counter 31 outputs count value ALP "2", values "0" to "120" can be output in accordance with the value of image data DIM with respect to the second lighting point (upper address "002"H; lower addresses "0"H to "F"H).

The effect of correction of variations in lighting intensity by lighting time designator 22 will be described next.

If lighting time designator 22 is not used, there is a ±20% variation in lighting intensity, as described above. In contrast to this, if lighting time designator 22 is used, 120 types of lighting times can be set with respect to each lighting intensity.

For example, therefore, with respect to lighting points with 80%, 100%, and 120% lighting intensities, lighting intensities can be set in units of the following values, respectively:

$$80/120 = 0.67\%$$

$$100/120 = 0.83\%$$

$$120/120 = 1.00\%$$

With this operation, lighting level errors occurring with respect to given lighting intensities (0 to 80%) are respectively reduced to ½ those described above, i.e., ±0.33%, ±0.42%, and ±0.50% at maximum, respectively. Note that these values are obtained with reference to a lighting point with 100% lighting level. In practice, since the maximum lighting level is set with reference to 80% lighting level, the maximum lighting level error with respect to this lighting level is $$\pm 0.50\%/(80/100) = \pm 0.63\%$$

Therefore, by using lighting time designator 22, the maximum lighting level variation of ±20% can be restricted to the maximum variation of ±0.63%.

The arrangement and the detailed correction effect of lighting time designator 22 have been described above. As is apparent from the above description, when 4-bit image data DIM is input to lighting time designator 22 in synchronism with an image clock, 7-bit lighting time data DLT ranging from "0" to "120" is output from memory 32 such that correction is performed with respect to each lighting point 14 in accordance with its lighting capacity. When each lighting point 14 emits light for a lighting time corresponding to lighting time data DLT, the lighting level of printer head 3 exhibits a ±0.63% variation with respect to 80% of the maximum lighting level. That is, by correcting the variations in the lighting intensity of printer head 3 by using lighting time designator 22, a halftone image without density irregularity can be obtained.

Figure 11:
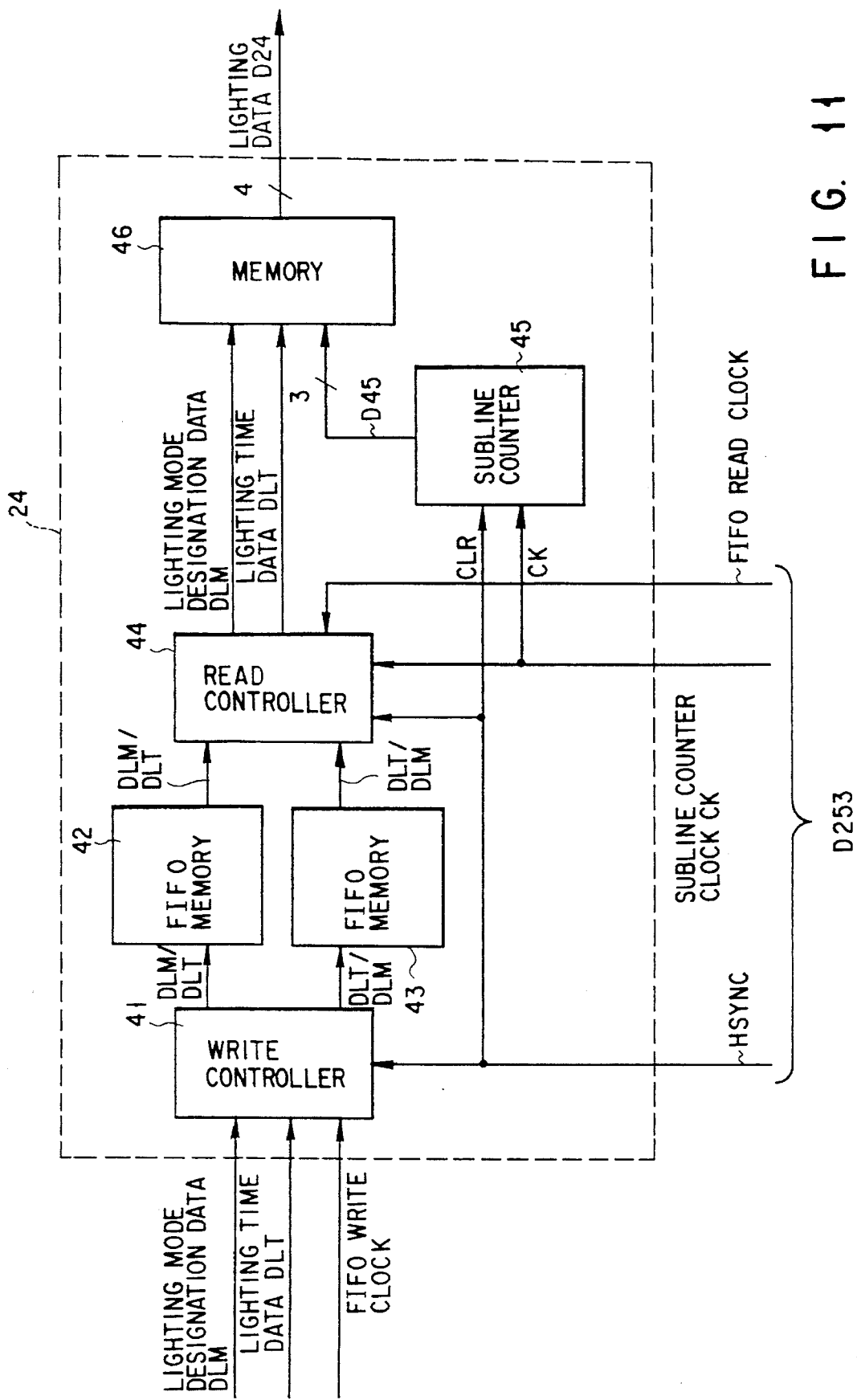
FIG. 11 is a block diagram showing the internal structure of light timing controller 24.

FIG. 11 shows the arrangement of light timing controller 24 shown in the block diagrams of FIGS. 5 and 7. As shown in FIG. 11, light timing controller 24 comprises write controller 41, two FIFO memories 42 and 43, read controller 44, subline counter 45, and memory 46.

Lighting time data DLT from lighting time designator 22 and lighting mode designation data DLM from lighting mode designator 23 or printer I/F 21 are written in FIFO memory 42 or 43 selected by write controller 41. When an HSYNC signal is input to write controller 41, the FIFO memories are switched to write lighting time data DLT and lighting mode designation data DLM therein.

The HSYNC signal is also input to read controller 44 to switch FIFO memories 42 and 43 for each scanning line so as to read data from one of the memories. That is, no read operation is performed with respect to a FIFO memory for which a write operation is being performed, but a read operation is performed with respect to a FIFO memory for which a write operation has been completed in the preceding scanning line period.

Subline counter 45 counts subline counter clocks supplied from timing signal generator 25. This count value is cleared by the HSYNC signal. As indicated by the timing charts of FIGS. 16 and 17, subline counter 45 counts seven within one scanning period of printer head 3. That is, one scanning period is divided into eight time intervals.

More specifically, subline counter 45 divides one scanning period of printer head 3 into eight sublines, from "0" to "7", as indicated by the timing charts of FIGS. 16 and 17. Output D45 from subline counter 45 is input, as a memory address, to memory 46.

A read operation with respect to FIFO memories 42 and 43 is performed eight times within one scanning period of printer head 3 in synchronism with a count operation of subline counter 45. Identical data are read out by this read operation performed eight times. The readout data is input, as a memory address, to memory 46.

Memory 46 incorporated in light timing controller 24 will be described next with reference to FIGS. 12 and 13.

Count value D45 as an address supplied from subline counter 45 and the data read out from FIFO memory 42 or 43 are input to memory 46. The data read out from FIFO memory 42 or 43 are lighting mode designation data DLM and lighting time data DLT. Address designation of memory 46 is performed upon reception of lighting mode designation data DLM and lighting time data DLT for each lighting point, in addition to count value D45 as an address input from subline counter 45. Upon this address designation, memory 46 outputs 4-bit lighting data D24 to printer head 3.

Figure 12:
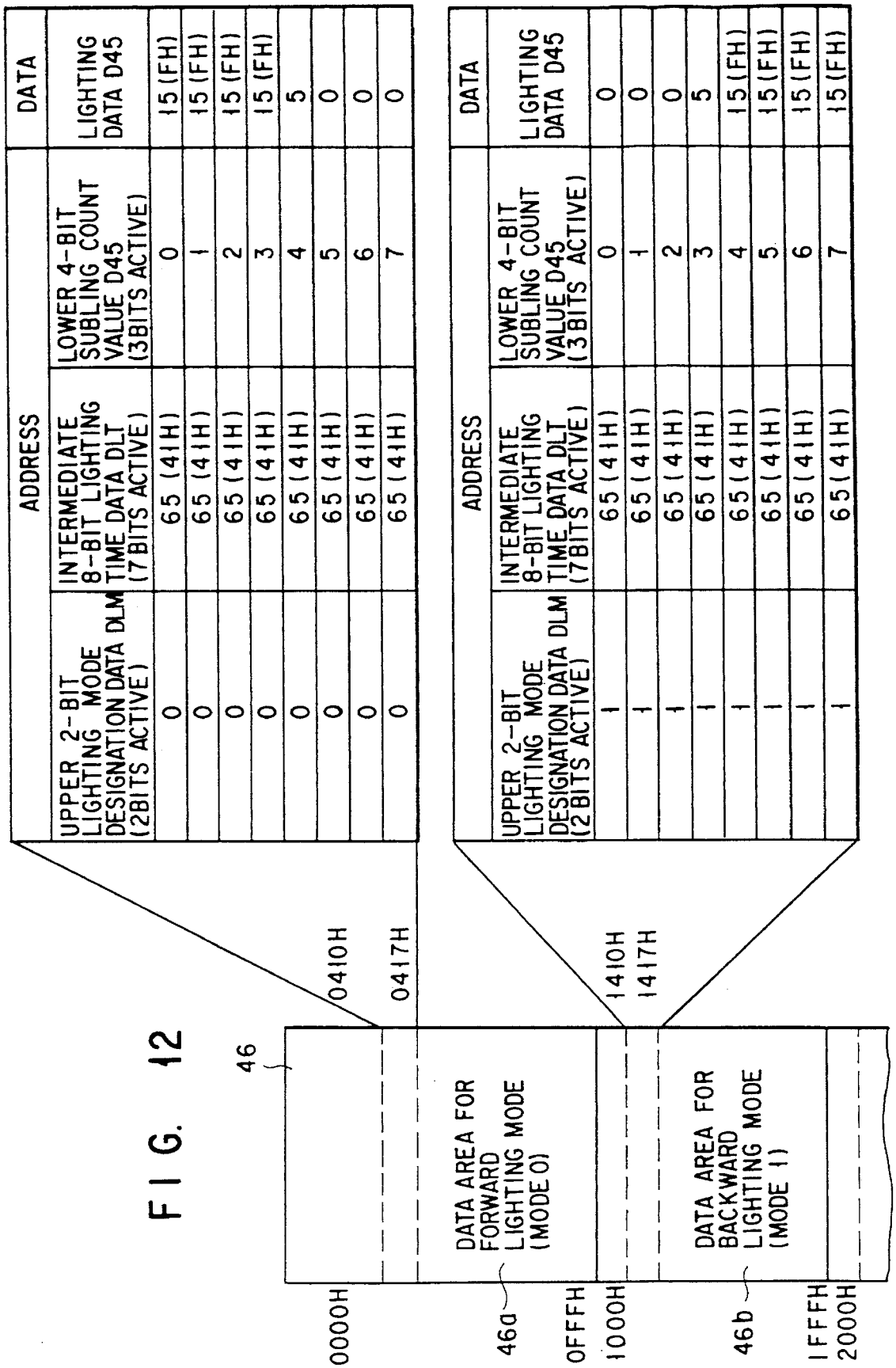
FIG. 12 is a format for explaining part of the contents stored in a memory incorporated in light timing controller 24.
Figure 13:
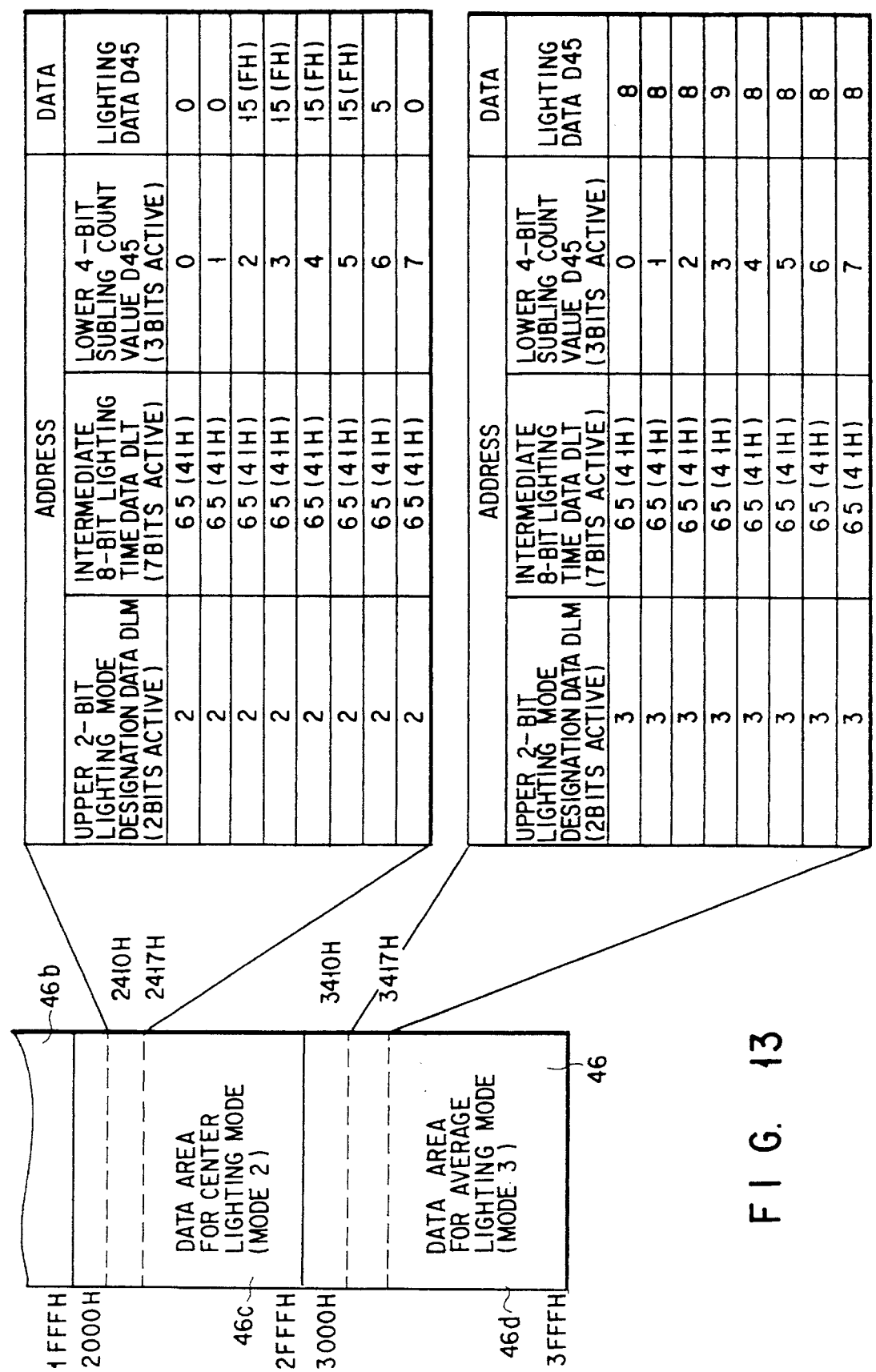
FIG. 13 is a format for explaining another part of the contents stored in the memory incorporated in light timing controller 24.

FIGS. 12 and 13 show the memory map of memory 46 incorporated in light timing controller 24. As shown in FIGS. 12 and 13, the data storage area of memory 46 is divided in accordance with the respective lighting modes. More specifically, addresses "0000"H to "0FFF"H define area 46a in which the lighting data of MODE 0 (forward lighting mode) are stored; addresses "1000"H to "1FFF"H define area 46b in which the lighting data of MODE 1 (backward lighting mode) are stored; addresses "2000"H to "2FFF"H define area 46c in which the lighting data of MODE 2 (center lighting mode) are stored; and addresses "3000"H to "3FFF"H define area 46d in which the lighting data of MODE 3 (average lighting mode) are stored.

The manner of address assignment in memory 46 will be briefly described below. Lighting mode designation data DLM is assigned to the upper two bits of an address. Lighting time data DLT is assigned to the intermediate eight bits of the address. In the embodiment, since lighting time data DLT consists of seven bits, the lower seven bits of the eight bits are actually assigned to lighting time data DLT (the upper one bit is fixed to "0"). Output D45 from subline counter 45 is assigned to the lower four bits of the address. In the embodiment, since output D45 from subline counter 45 consists of three bits, output D45 from subline counter 45 is actually assigned to the lower three bits of the address (the upper one bit is fixed to "0").

FIGS. 12 and 13 show the correspondence between an address to be accessed and data in a case wherein lighting time data is "65" ("41"H).

As shown in FIG. 12, when lighting mode designation data DLM is "0" (forward lighting mode), addresses "0410"H to "0417"H of memory 46 are accessed. That is, when output value D45 from subline counter 45 is "0", data D24="15" ("F"H) stored at address "0410"H is transferred to printer head 3.

Assume that when lighting mode designation data DLM is "0" (forward lighting mode) and lighting time data DLT is "65" ("41"H), while subline counter 45 outputs output value D45="1". In this case, data "15" ("F"H) stored at address "0411"H is transferred to printer head 3.

Similarly, when subline counter 45 outputs output value D45="2", data "15" ("F"H) is transferred to printer head 3; when subline counter 45 outputs output value D45="3", data "15" ("F"H) is transferred to printer head 3; when subline counter 45 outputs output value D45="4", data "5" is transferred to printer head 3; when subline counter 45 outputs output value D45="5", data "0" is transferred to printer head 3; when subline counter 45 outputs output value D45="6", data "0" is transferred to printer head 3; and when subline counter 45 outputs output value D45="7", data "0" is transferred to printer head 3.

When lighting mode designation data DLM is "1" (backward lighting mode), addresses "1410"H to "1417"H of memory 46 are accessed. In this case, light data transferred to printer head 3 is changed by output value D45 from subline counter 45. More specifically, when output value D45 from subline counter 45="0" to "2", data D24="0"; when output value D45="3", data D24="5"; and when output value D45="4" to "7", data D24="15" ("F"H).

As shown in FIG. 13, when lighting mode designation data DLM is "2" (center lighting mode), address "2410"H to "2417"H of memory 46 are accessed. In this case, lighting data D24 transferred to printer head 3 is changed by output value D45 from subline counter 45. More specifically, when output value D45 from subline counter 45="0" to "1", data D24="0"; when output value D45="2" to "5", data D24="15" ("F"H); when output value D45="6", data D24="5" ("F"H); and when output value D45="7", data D24="0".

When lighting mode designation data DLM is "3" (average lighting mode), addresses "3410"H to "3417"H of memory 46 are accessed. In this case, the value of lighting data D24 transferred to printer head 3 is also changed by output value D45 from subline counter 45. More specifically, when output value D45 from subline counter 45 is "0" to "2", lighting data D24="8"; when output value D45="3", lighting data D24="9"; and when output value D45="4" to "7", lighting data D24="8".

As described above, the value of lighting data D24 stored in memory 46 differs depending on lighting mode designation data DLM. However, while output value D45 from subline counter 45 changes from "0" to "7", the sum of lighting data D24 transferred to printer head 3 becomes "65" ("41"H) in each of the four types of lighting modes.

That is, lighting data are written in memory 46 such that the total lighting times of printer head 3 in the different modes become equal to each other if identical lighting time data DLT are set.

In order to explain the meaning of the abovementioned 4-bit lighting data D24, the internal arrangement of printer head 3 will be described below with reference to FIGS. 14 and 15.

Figure 14:
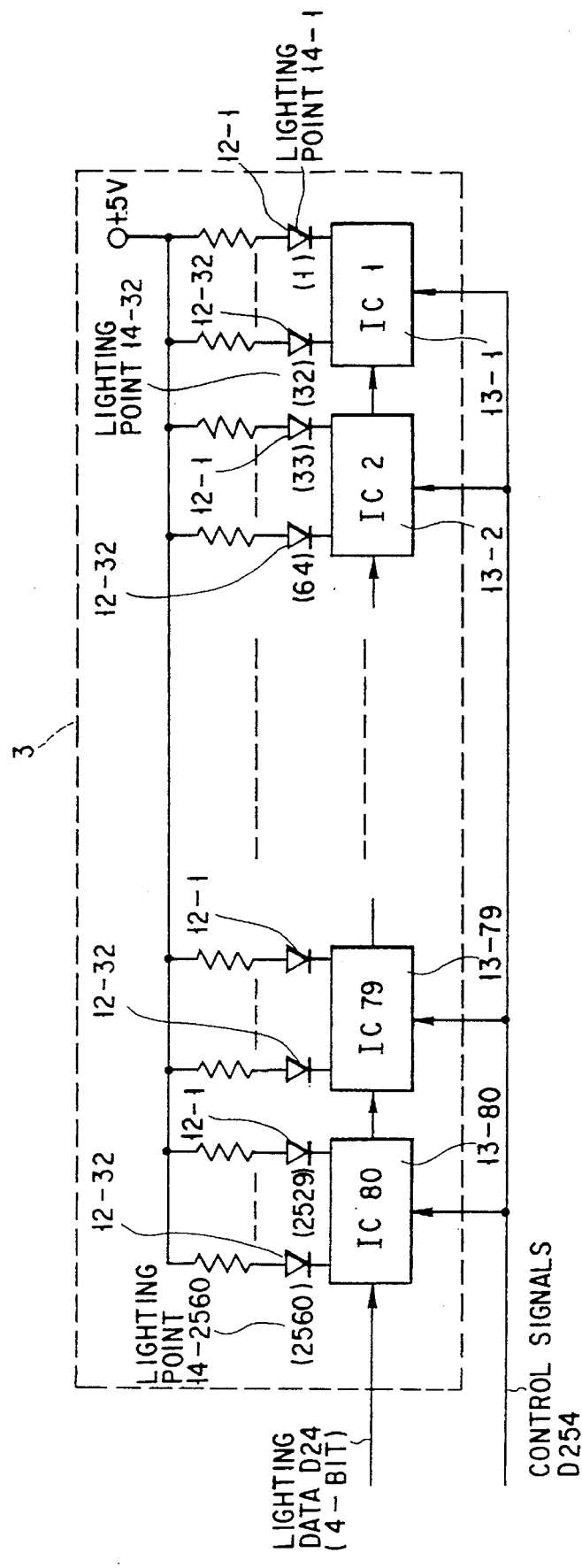
FIG. 14 is a view showing a circuit arrangement of printer head 3.

FIGS. 14 shows an internal circuit of printer head 3 using LEDs as light-emitting elements. As shown in FIG. 14, printer head 3 incorporates 2,560 LEDs (assume that printer head 3 includes 40 LED chips, each having 64 LEDs) as lighting points 14 (see FIG. 2) for exposing photosensitive drum 1, and 80 driving IC chips 13 for driving these LEDs (lighting points 14) (there are 80 sets of 32 LEDs 12-1 to 12-32). Note that 80 driving IC chips will be referred to as IC1 to IC80, as needed.

First, 4-bit lighting data D24 from light timing controller 24 is input to IC80. Input data D24 is sequentially shifted to adjacent IC79, IC78, . . . through the shift registers in the respective ICs. Upon completion of the input of lighting data for one scanning operation, i.e., lighting data for 2,560 pixels, data D24 have been input to all the ICs, i.e., IC80 to IC1.

The internal arrangement of each driving IC chip 13 will be described next with reference to FIG. 15. Driving IC chip 13 (e.g., IC80) comprises 4-bit counter 51, shift register 52, thirty-two 4-bit latches 53, thirty-two 4-bit comparators 54, and 32 drivers 55.

As described above, lighting data D24 is input to shift register 52 first. Driving IC chip 13 (IC80) can drive/control 32 lighting points 14 (LEDs 12-1 to 12-32) by itself. Upon reception of 32 or more lighting data D24, shift register 52 transfers lighting data D24 to shift register 52 of next driving IC chip 13 (IC79). When lighting data D24 are sequentially transferred in this manner, and the transfer of lighting data D24 for one scanning line is completed, the first 32 lighting data D24 have been transferred to IC1, and the last 32 lighting data D24 have been transferred to IC80.

When the transfer of lighting data D24 for one scanning line is completed, a subline counter clock is input to 4-bit counter 51 and 4-bit latches 53. As described above, 4-bit latches 53 constitute a 4 bits×32 configuration. Therefore, 4 bits×2,560 lighting data for one scanning line are all latched in IC1 to IC80.

Four-bit counter 51 is cleared by the subline counter clock to start counting a 4-bit counter clock. As indicated by the timing charts of FIGS. 16 and 17, a 4-bit counter clock has 16 pulses within one period of a subline counter clock. Therefore, 4-bit counter 51 counts from "0" to "15" within one period of a subline counter clock. That is, 4-bit counter 51 divides one period of a subline counter clock into 16 time intervals.

The relationship between this count operation and the overall timing will be summarized below. As indicated by the timing charts of FIGS. 16 and 17, subline counter 45 counts from "0" to "7" in the time interval in which lighting mode designation data DLM and lighting time data DLT for one scanning line are transferred, i.e., within one period (one scanning period) of the HSYNC signal. Since 4-bit counter 51 in printer head 3 counts from "0" to "15" within one period of subline counter 45, the count operation of 4-bit counter 51 is repeated eight times during one period of the HSYNC signal.

That is, subline counter (first division means) 45 divides one scanning period into eight time intervals, and 4-bit counter (second division means) 51 further divides each time interval divided by subline counter 45 into 16 time intervals.

Output value D51 from 4-bit counter 51, which performs a count operation at the above-mentioned period, is compared with the value latched by each 4-bit latch 53 by a corresponding one of 4-bit comparators 54. Each comparison result is output to a corresponding one of drivers 55. When data from 4-bit latch 53 is larger than the count value of 4-bit counter 51, 4-bit comparator 54 sets an output at high level. When an output from 4-bit comparator 54 is at high level, driver 55 drives a corresponding LED to emit light.

The timing chart shown in FIG. 17 indicates lighting times set when lighting time data latched by 4-bit latch 53 is "1", "2", and "15" ("F"H), respectively. As shown in FIG. 17, when the 4-bit data from 4-bit latch 53 is "1", lighting is performed until output value D51 from 4-bit counter 51 becomes "1". Similarly, when the data from 4-bit latch 53 is "2", lighting is performed until output value D51 from 4-bit counter 51 becomes "2"; and when the data is "15" ("F"H), lighting is performed until output value D51 from 4-bit counter 51 becomes "15".

As described above, by transferring 4-bit lighting data D24 to printer head 3, the lighting time of printer head 3 can be changed at a period corresponding to 1/16 the count period of subline counter 45. In addition, since 15 types of lighting times are available within one count period of subline counter 45, and eight sublines are set in one scanning period, 120 types of lighting times (121 types, if lighting time "0" is counted) can be set in one scanning period.

Figure 31:
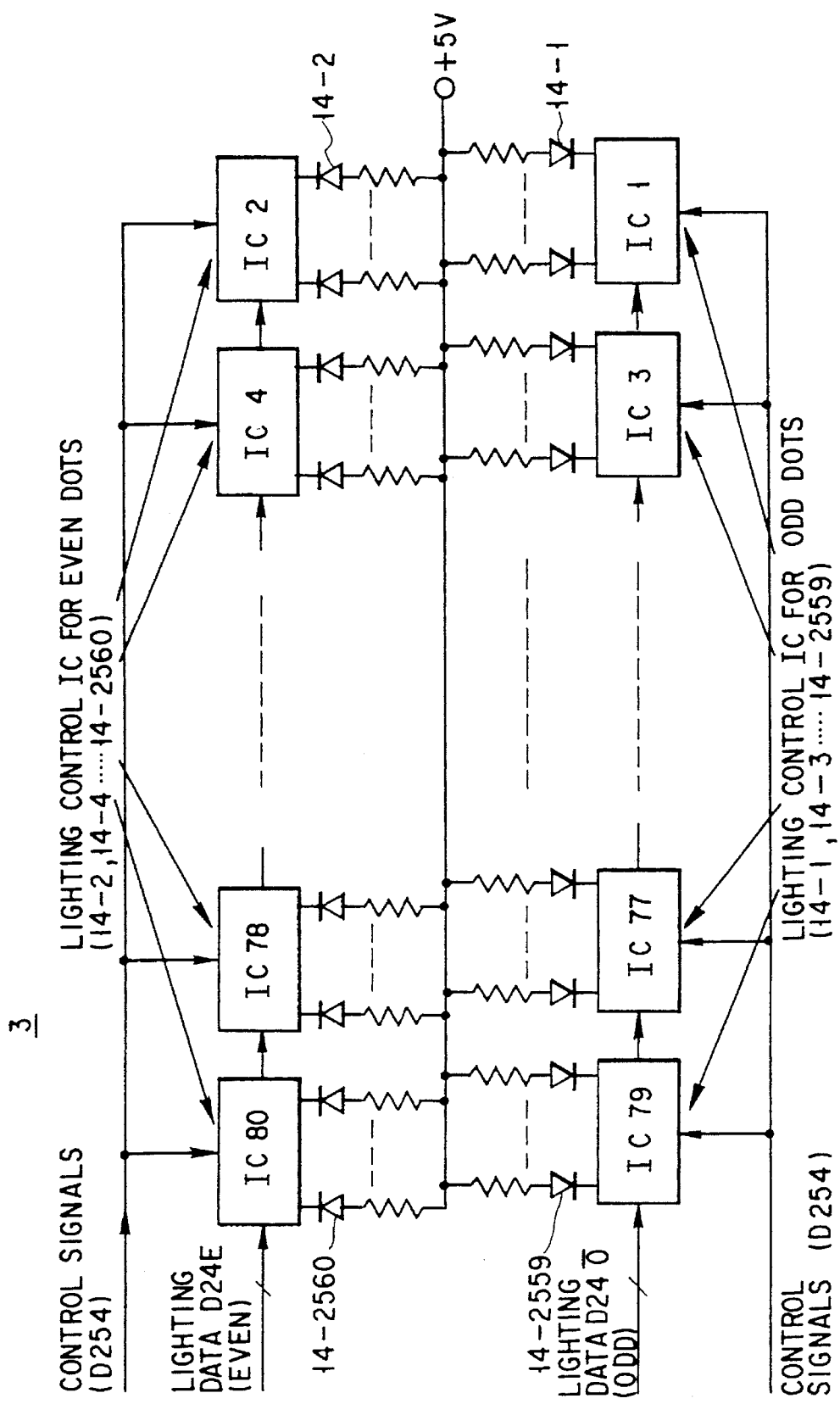
FIG. 31 is a block diagram showing another circuit arrangement of a printer head.

For the sake of descriptive convenience, the above example describes a case wherein 80 driving IC chips 13 are connected in a row. However, according to the arrangement of printer head 3 shown in FIG. 2, 80 driving IC chips 13 are arranged, 40 by 40, on both sides of LED chips 12. In such an arrangement, for example, as shown in FIG. 31, 40 driving IC chips 13 (IC1, IC3 ... IC79) are used to drive odd lighting points 14, and 40 driving IC chips 13 (IC2, IC4, ..., IC80) are used to drive even lighting points 14, while two types of lighting data D24, i.e., lighting data D24E for even lighting points and lighting data $\overline{E24O}$ for odd lighting points, are independently transferred.

Figure 18:
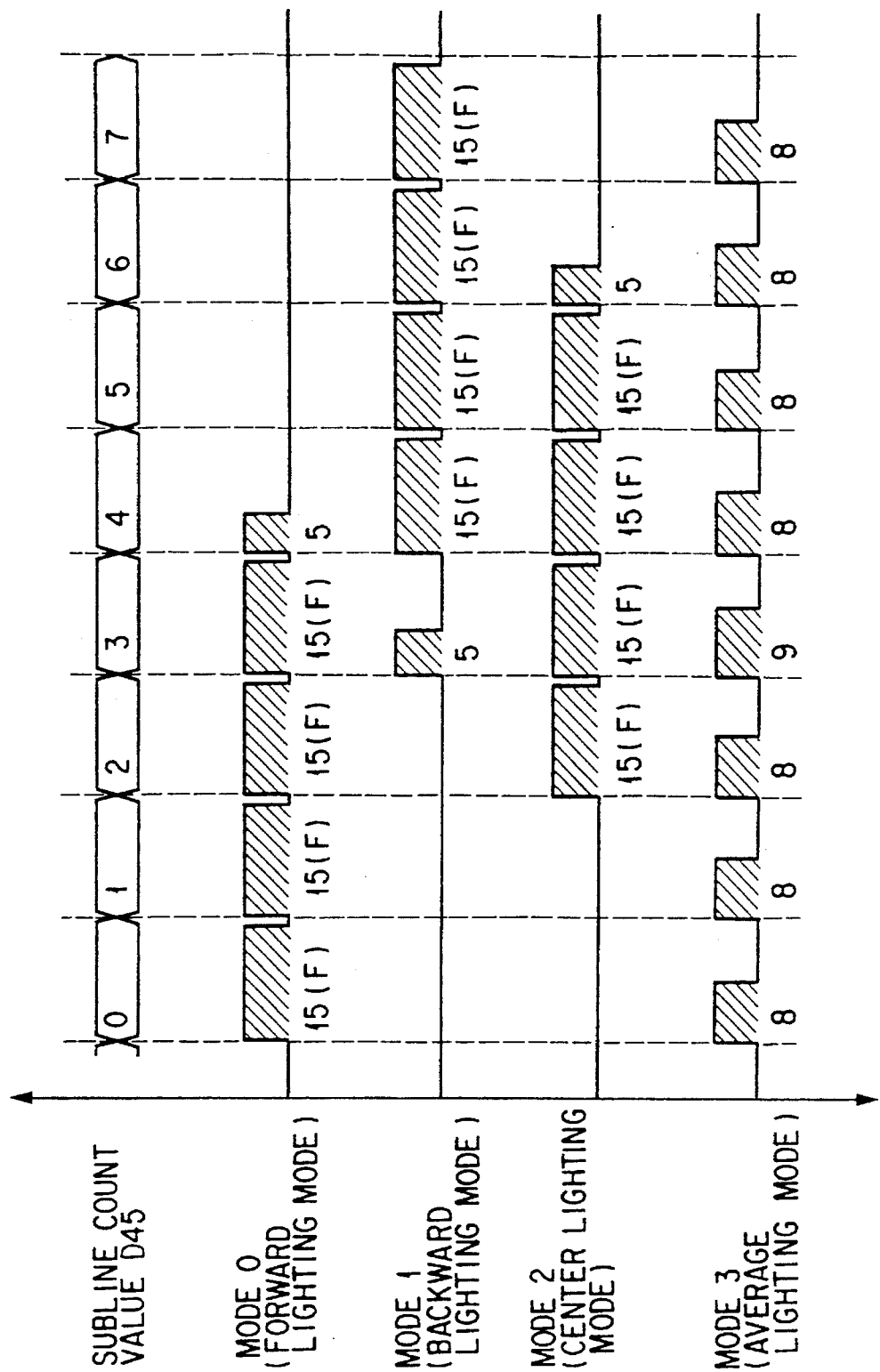
FIG. 18 is a timing chart showing an example of how different light timings are set in different lighting modes.

FIG. 18 is a timing chart showing how lighting is performed when "65" ("41"H) is input, as lighting time data DLT, to light timing controller 24. As can be seen from FIG. 18, when the forward lighting mode is designated, lighting is performed on the basis of the data stored in area 46a in FIG. 12 while subline counter 45 counts from "0" to "4". In this case, lighting is performed immediately after the preceding scanning line.

It is also apparent from FIG. 18 that when the backward lighting mode is designated, lighting is performed on the basis of the data stored in area 46b in FIG. 12 while subline counter 45 counts from "3" to "7". In this case, therefore, lighting is performed immediately before the subsequent scanning line.

In the backward lighting mode, the timing of lighting performed when the count value of subline counter 45 is "3" is separated from that of lighting performed when the count value of subline counter 45 is "4" or more. This phenomenon is peculiar to the circuit arrangement of the embodiment.

When the center lighting mode is designated, lighting is performed on the basis of the data stored in area 46c in FIG. 13 while subline counter 45 counts from "2" to "6". In this case, lighting is performed at almost the center of the scanning line.

When the average lighting mode is designated, lighting is performed on the basis of the data stored in area 46d in FIG. 13 while subline counter 45 counts from "0" to "7". In this case, lighting is performed at equal intervals throughout the scanning line.

The four types of lighting modes (MODE0 to MODE3 in FIG. 18) have been briefly described above. In each lighting mode, the same lighting energy is supplied to photosensitive drum 1. The four types of lighting patterns on the current scanning line shown in FIG. 6 can be realized by using light timing controller 24 having a function of changing the light timing in accordance with a lighting mode designated for each lighting point.

In the above example, one scanning period is divided into eight time intervals by subline counter (first division means) 45, and each time interval is further divided into 16 time intervals by 4-bit counter (second division means) 51. However, the present invention is not limited to this. One scanning period may be divided by an integer equal to two or more to obtain a print speed increasing effect corresponding to the division count. If, however, the division count is too large, it takes much time to perform data transfer, resulting in a low print speed again.

As the division count of the second division means (4-bit counter 51) is increased (i.e., the bit count of 4-bit counter 51 is increased), a larger number of gradation levels can be expressed, and the effect of correcting the variations in the lighting level of the lighting means is improved. However, the size of a circuit incorporated in the printer head increases, which is not practical. Note that the circuit incorporated in printer head 3 can be simplified by using a 3-bit counter in place of 4-bit counter 51.

As described above, according to the present invention, a division count (or number of dividing) can be freely selected for one scanning period in accordance with the print speed, the degree of variation in the lighting capacity of the printer head, required image quality, and the like.

Figure 19:
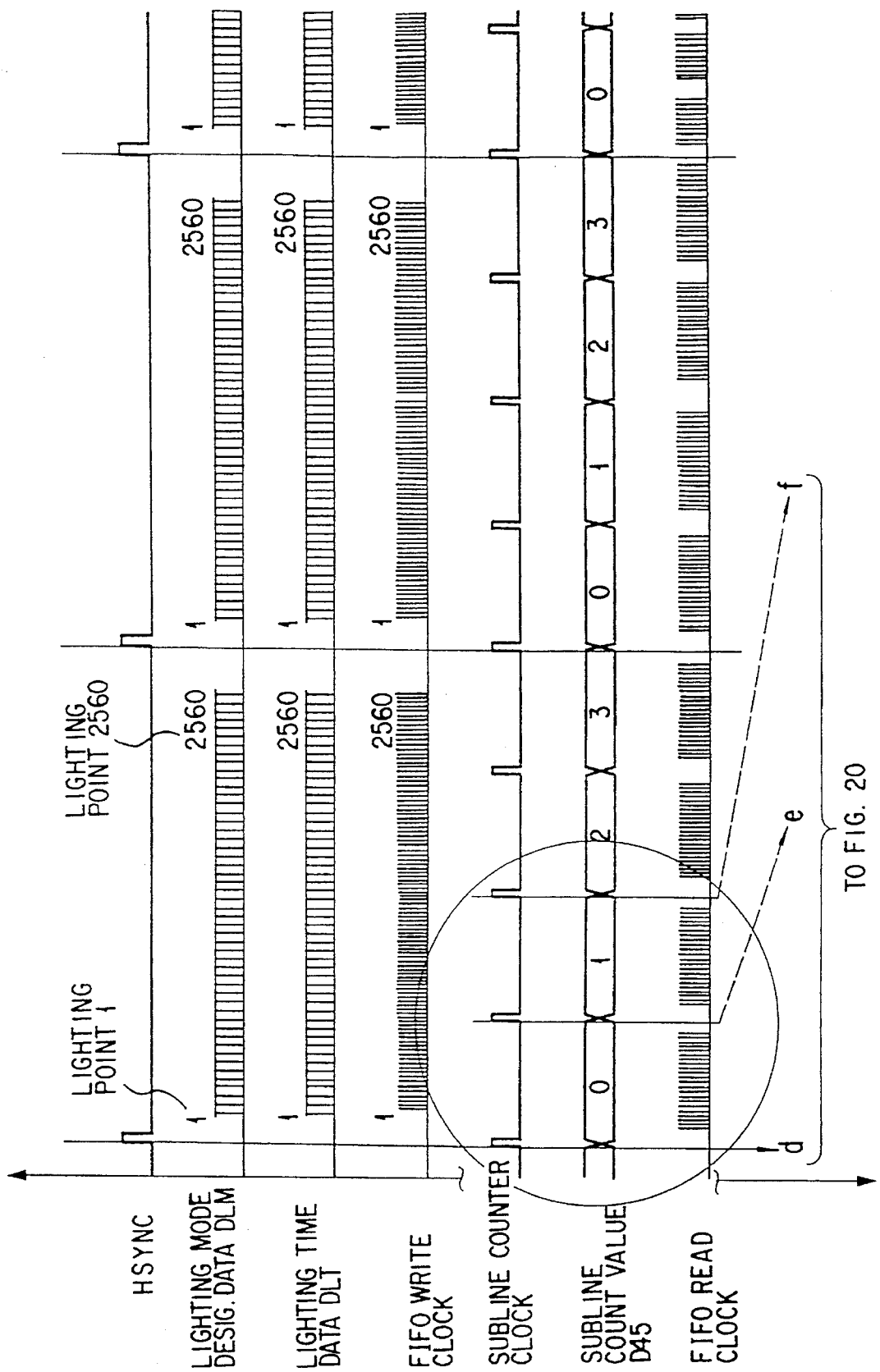
FIG. 19 is a timing chart for explaining another example of the lighting operation of printer head 3.
Figure 20:
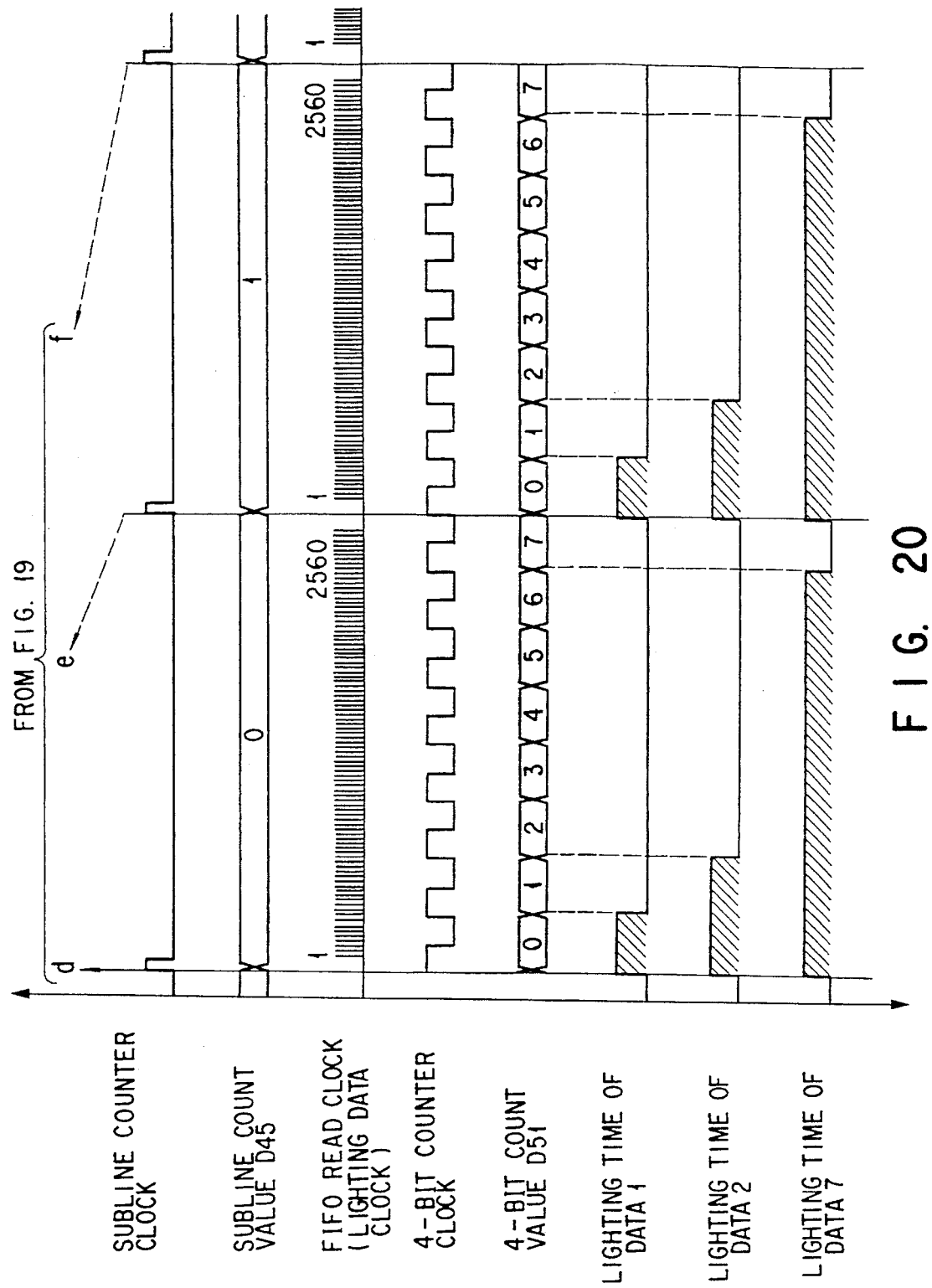
FIG. 20 is a timing chart showing part of the lighting operation shown in FIG. 19 in detail.

FIGS. 19 and 20 show cases wherein different division counts are set. FIG. 19 is a chart showing a state in which subline counter 45 divides one scanning period into four time intervals. FIG. 20 is a chart showing a state in which a 3-bit counter as the second division means (counter 51 incorporated in printer head 3) further divides each time interval, divided by subline counter (first division means) 45, into eight time intervals. In such an arrangement, as is apparent from the chart, 28 types of lighting times (29 types, if lighting time "0" is counted) can be set.

FIG. 21 shows how lighting is performed when data "15" ("F"H) is supplied as lighting time data. Similar to the case shown in FIG. 18, it is apparent from FIG. 21 that different light timings are set in accordance with the lighting modes (0 to 3). More specifically, when the forward lighting mode is designated, lighting is performed while output D45 from subline counter 45 changes from "0" to "2". In this case, lighting is performed immediately after the preceding scanning line.

It is also seen from FIG. 21 that when the backward lighting mode is designated, lighting is performed while output D45 from subline counter 45 changes from "1" to "3". In this case, therefore, lighting is performed immediately before the subsequent scanning line. Similar to the above-described case, the timing of lighting performed when output D45 from subline counter 45 is "1" is separated from that of lighting performed when output D45 from subline counter 45 is "2" or more. This phenomenon is unique to the circuit arrangement of the embodiment.

When the center lighting mode is designated, lighting is performed while output D45 from subline counter 45 changes from "1" to "3". In this case, lighting is performed at almost the center of the scanning line.

When the average lighting mode is designated, lighting is performed in all the time intervals during which output D45 from subline counter 45 changes from "0" to "3". In this case, lighting is performed at equal intervals throughout the scanning line.

In the above example, one scanning period is divided into four time intervals by the first division means (subline counter 45), and each time interval is further divided into eight time intervals by the second division means (the 3-bit counter (not shown) corresponding to 4-bit counter 51). In comparison with this example, it is apparent that a larger number of gradation levels can be expressed and a round edge treatment can be performed more smoothly in the previously described example in which the first division means (subline counter 45) divides one scanning period into eight time intervals, and the second division means (4-bit counter 51) further divides each time interval into 16 time intervals.

In this example, however, the print speed can be increased by shortening the time required for data transfer, and the circuit incorporated in printer head 3 can be simplified by using a 3-bit counter in place of a 4-bit counter.

As described above, according to the present invention, division counts are properly selected for the two division means in accordance with the print speed, the degree of variation in lighting capacity of the printer head, required image quality, and the like.

A method of designating a lighting mode through a control panel will be described next with reference to FIG. 22. As shown in FIG. 22, lighting mode designation data DLM is output from lighting mode designator 23A.

Lighting mode designator 23A is connected to control panel 27 so that lighting mode designation data DLM is determined by lighting mode information D27 designated by the user of the printer through control panel 27. If, for example, the forward lighting mode is designated through control panel 27, lighting mode designation data DLM for the forward lighting mode is output from lighting mode designator 23A and is input to light timing controller 24.

Figure 23:
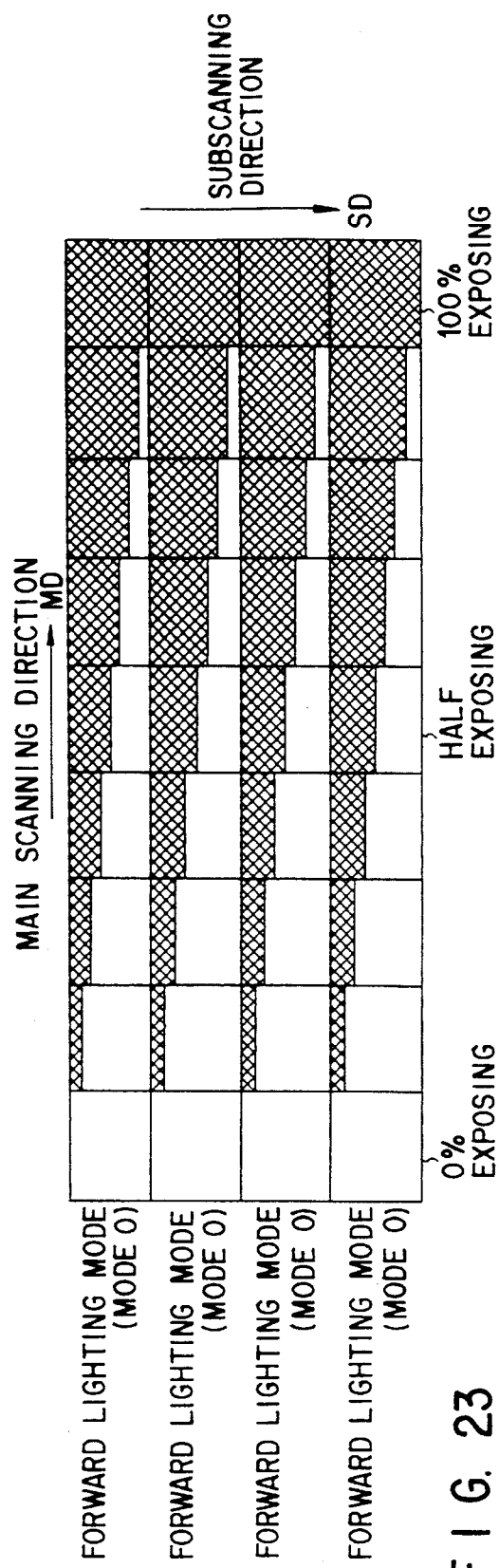
FIG. 23 is a chart illustrating an exposure pattern obtained when lighting is performed in a forward lighting mode (MODE 0)
Figure 24:
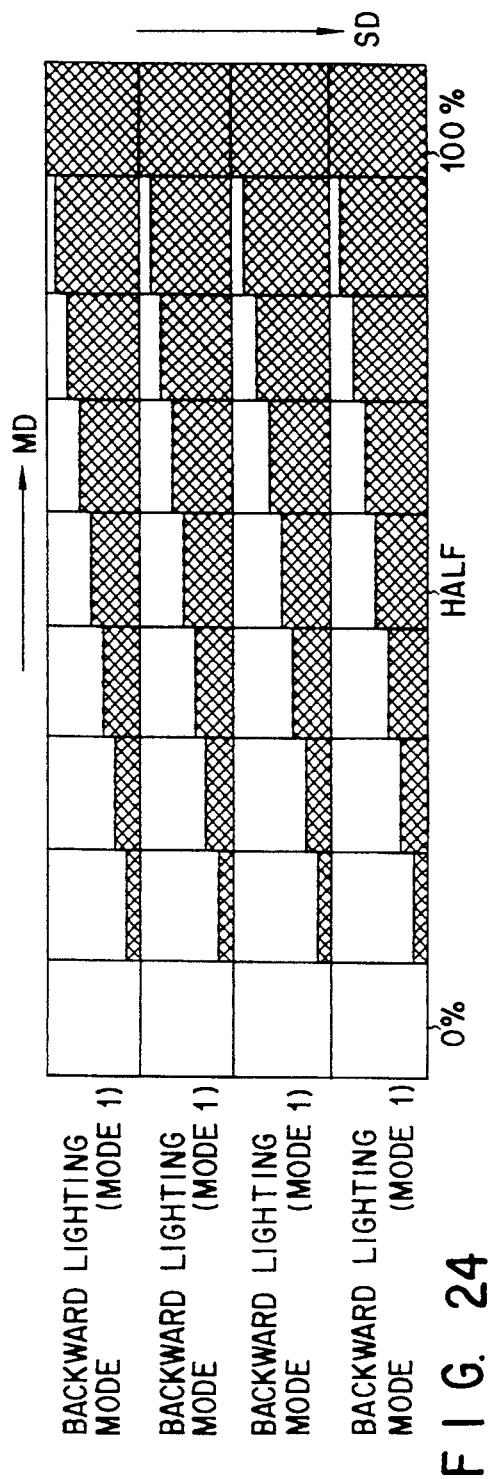
FIG. 24 is a chart illustrating an exposure pattern obtained when lighting is performed in a backward lighting mode (MODE 1)
Figure 25:
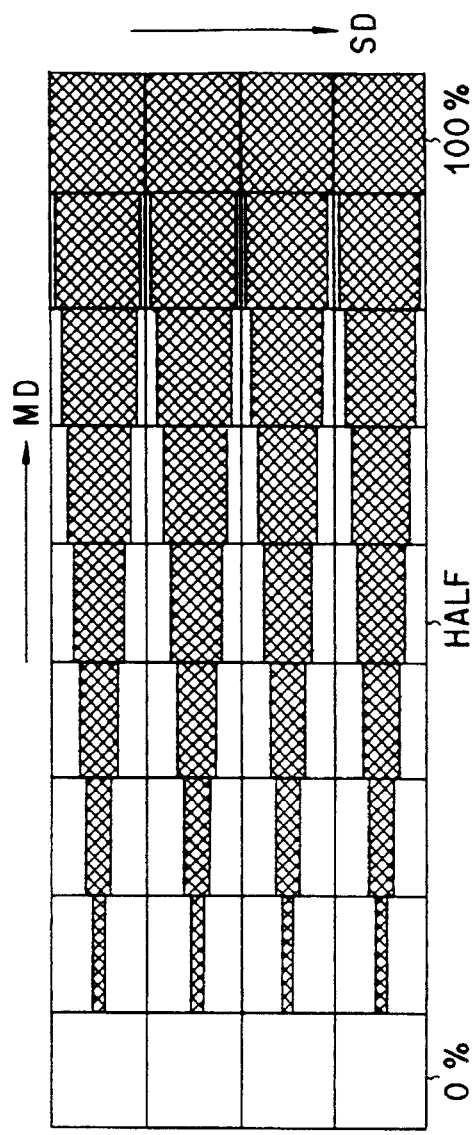
FIG. 25 is a chart illustrating an exposure pattern obtained when lighting is performed in a center lighting mode (MODE 2)
Figure 26:
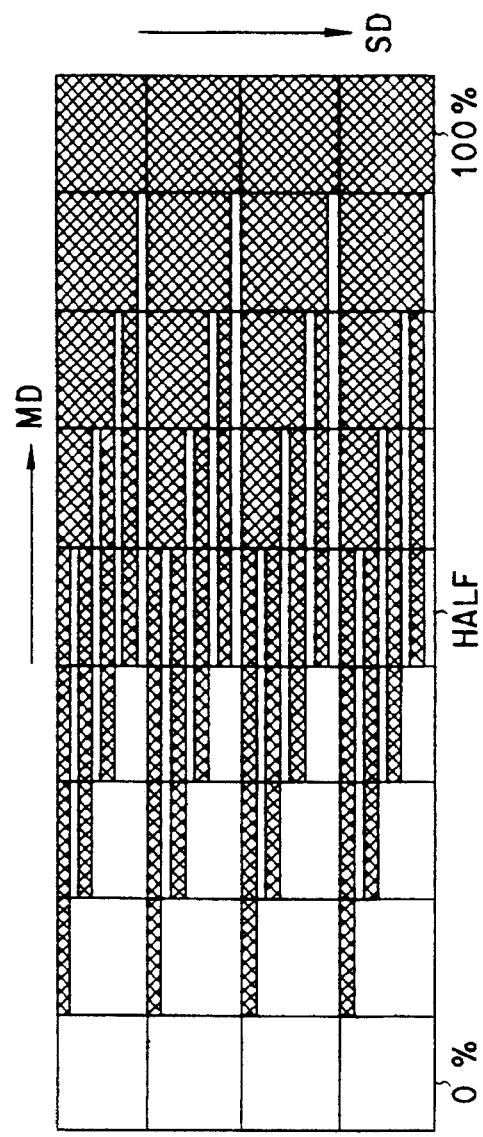
FIG. 26 is a chart illustrating an exposure pattern obtained when lighting is performed in an average lighting mode (MODE 3)

FIG. 23 illustrates an exposure result on photosensitive drum 1 in a case wherein the image density is gradually increased in the forward lighting mode. Referring to FIG. 23, the lateral direction corresponds to the main scanning direction; and the vertical direction, the subscanning direction. Exposure is performed downward. Similarly, FIGS. 24, 25, and 26 illustrate exposure results obtained when the backward lighting mode, the center lighting mode, and the average lighting mode are designated. This mode designation may be automatically performed in accordance with the contents of image data DIM (e.g., whether the image data is a character or photographic image).

Figure 27:
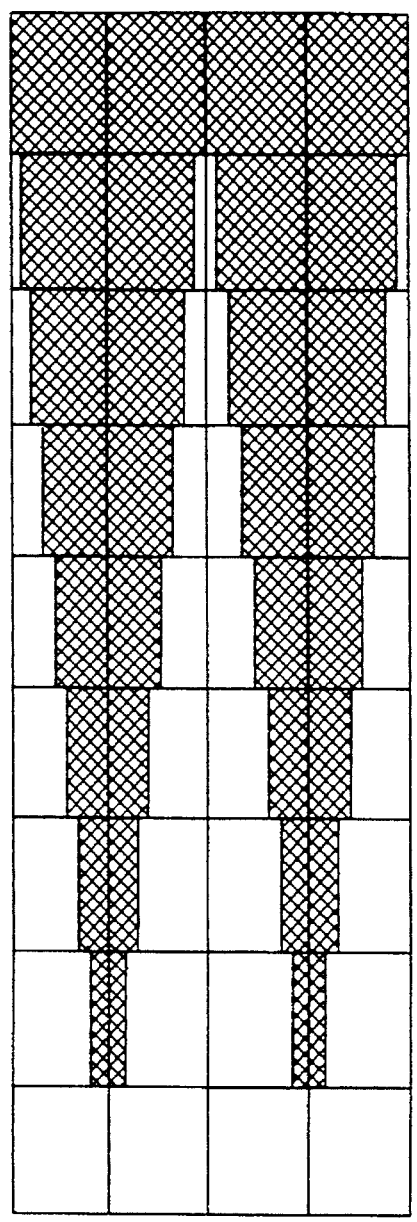
FIG. 27 is a chart illustrating an exposure pattern obtained when lighting is performed with a combination of the forward lighting mode (MODE 0) and the backward lighting mode (MODE 1)

FIG. 27 illustrates an exposure result obtained when the forward lighting mode and the backward lighting mode are combined. Such an exposure pattern can be realized by inputting the above-mentioned HSYNC signal to lighting mode designator 23 and changing lighting mode designation data DLM between the forward lighting mode and the backward lighting mode for each scanning line in response to the HSYNC signal. As is apparent from FIG. 27, exposure operations for two scanning lines are continuous in this exposure pattern.

More specifically, according to the exposure patterns shown in FIGS. 23 to 26, one or more lighting starts and one or more lighting ends are present for each lighting operation, except for a full lighting operation. In contrast to this, according to the exposure pattern shown in FIG. 27, only one lighting start and one lighting end are present for two lighting operations with respect to upper and lower scanning lines. It is known that the exposure pattern formed by such a lighting pattern allows relatively stable development (the exposure area is proportional to the area where toner particles are attracted), in comparison with other exposure patterns, owing to the characteristics of an electrophotograph.

In this embodiment, therefore, such a lighting mode can be designated through control panel 27 so that the user can select this lighting pattern when he/she wants to set the exposure area to be more accurately proportional to the area where toner particles are attracted (to express gradation more accurately).

Selection of this lighting pattern can be performed through printer I/F 21 as well as control panel 27. That is, as shown in FIG. 22, a lighting mode can be designated by inputting command CMD from an external unit to lighting mode designator 23.

In the above-described embodiment, the present invention is applied to a printer head using LEDs as light-emitting elements serving as light-emitting portions. However, the present invention is not limited to this. For example, the present invention can be equally applied to a printer head using EL elements or phosphors as light-emitting elements.

In addition, light-emitting portions are not limited to LEDs, EL elements, and phosphors. For example, an optical shutter array such as a liquid crystal array may be used. A printer head using a liquid crystal shutter array as light-emitting elements will be briefly described below with reference to FIG. 28.

As is known, a liquid crystal shutter array itself does not emit light. For this reason, the liquid crystal shutter array exposes photosensitive drum 1 by controlling light illuminated from light source (e.g., a fluorescent lamp 61), disposed behind the shutter array, using the electrooptic effect of each liquid crystal element (liquid crystal cell).

In general, a liquid crystal shutter array uses two glass substrates 62 and 63 for sealing a liquid crystal, and controls electrodes 64 and 65 arranged on glass substrates 62 and 63 to change the state of the molecular alignment of liquid crystal layer 66, thereby controlling the passage of light from light source 61.

In this embodiment, a twisted nematic (TN) type liquid crystal shutter array is used. Deflecting plates (deflectors) 67 and 68 are arranged outside two glass substrate 62 and 63, respectively, such that the deflection directions of both the plates are set to be vertical. Liquid crystal layer 66 is arranged between glass substrates 62 and 63. In the absence of an electric field, liquid crystal layer 66 exhibits 90° optical rotatory power, so that light from light source 61 passes through deflecting plate 67 and is rotated through 90° along the twists of the liquid crystal molecules of liquid crystal layer 66. Therefore, the light which has passed through liquid crystal layer 66 passes through another deflecting plate 68.

In the presence of an electric field, the liquid crystal molecules of liquid crystal layer 66 are aligned parallel to the electric field direction. As a result, the 90° optical rotatory power disappears. Therefore, light from light source 61 passes through deflecting plate 67, and the light which has passed through liquid crystal layer 66 cannot pass through another deflecting plate 68 to be blocked.

Referring to FIG. 28, ITO (indium oxide) films 64 and 65 formed on both sides of liquid crystal layer 66 are transparent electrodes for forming an electric field. The molecular alignment of liquid crystal layer 66 changes in accordance with the electric field between ITO films 64 and 65. In this case, electrode (ITO) 64 on the light source 61 side serves as a common electrode to which the same potential with respect to the respective liquid crystal shutters is applied. The shape of each liquid crystal shutter is defined by a light-shielding film (Cr) formed around electrode 64.

The potential of electrode 65 on the self focus lens array 15 side is controlled by a thin-film transistor (not shown) formed on the extension line of aluminum wiring layer 70. With this control, the molecular alignment of the liquid crystal in each liquid crystal shutter is controlled.

Polyimide layers 71 and 72 respectively formed between liquid crystal layer 66 and electrodes 64 and 65 are molecular alignment layers for obtaining uniform, stable liquid crystal molecular arrays. In addition, silicon nitride (SiNx) layer 73 formed between glass substrate 63 and electrode 65 is a transparent insulating film.

By controlling the molecular alignment of the liquid crystal in each liquid crystal shutter with the above-described arrangement, lighting level (exposure level) with respect to photosensitive drum 1 can be controlled. Furthermore, by electrically controlling the switching time of each liquid crystal shutter, the exposure time (the lighting time of each light-emitting portion) can be controlled.

With a printer head using such a liquid crystal shutter array, the same effects as those in the abovedescribed embodiment can be expected.

As described above, according to the abovedescribed embodiment, the variations in lighting intensity of the light-emitting elements or the variations in transmittance of the optical shutters can be corrected, and gradation with no density irregularity can be expressed without lowering the print speed of the printer. In addition, by designating a lighting mode at each lighting point, the light timing of each light-emitting element or the switching timing of each optical shutter can be finely controlled, thereby enabling a round edge treatment and uniform exposure.

Furthermore, the embodiment includes the means for determining a lighting mode at each lighting point. For this reason, by only transferring image data from an externa unit, the photosensitive drum can be exposed in an optimal lighting state for the image data.

Moreover, since a lighting mode can be selected by designation through a control panel or an external unit, image quality required by the user can be easily selected.

As has been described in detail above, according to the present invention, there is provided a printer head driving apparatus which can correct variations in lighting intensity of the light-emitting elements of a printer head or variations in transmittance of the optical shutters of the printer head, and can express gradation with no density irregularity without lowering the print speed.

In addition, according to the present invention, there is provided a printer head driving apparatus which can perform a round edge treatment by finely controlling the light timing of each light-emitting element or the switching timing of each optical shutter.

Furthermore, according to the present invention, there is provided a printer head driving apparatus which can minimize a reduction in exposure area by continuously exposing adjacent portions to be exposed in the subscanning direction (the moving direction of a surface to be exposed), thereby realizing more stable halftone image recording (gradation recording).

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An apparatus for driving a printer head including a plurality of lighting dots, said apparatus comprising:

first determining means for determining a first lighting period of the lighting dots within one scanning time period of the printer head, in accordance with image data supplied to the apparatus, so as to provide first information representing the determined first lighting period;

first dividing means for dividing the one scanning time period into m subline periods each being denoted by second information;

second determining means for determining a second lighting period of the lighting dots within each of the subline periods, in accordance with the first information provided by said first determining means and the second information provided by said first dividing means, so as to provide third information representing the determined second lighting period;

second dividing means for further dividing each of the subline periods into n portions to provide fourth information representing each of the portions; and means for controlling lighting operation of the lighting dots in accordance with the third information provided by said second determining means and the fourth information provided by said second dividing means.

2. An apparatus for driving a printer head which includes a plurality of lighting dots and scans a surface to be exposed by the printer head, said apparatus comprising:

first determining means for determining a first lighting period of the lighting dots within one scanning time period of the printer head, in accordance with image data supplied to the apparatus, so as to provide first information representing the determined first lighting period;

first dividing means for dividing the one scanning time period into m subline periods each being denoted by second information;

lighting mode selecting means for selecting at least one of a plurality of lighting modes that determines when the lighting dots should be lighted within the one scanning time period of the printer head, so as to provide a mode information representing the selected lighting mode;

second determining means for determining a second lighting period of the lighting dots within each of the subline periods, in accordance with the first information provided by said first determining means, the second information provided by said first dividing means, and the mode information provided by said lighting mode selecting means, so as to provide third information representing the determined second lighting period;

second dividing means for further dividing each of the subline periods into n portions to provide a fourth information representing the further divided scanning time period, said number n being an integer larger than 1; and means for controlling lighting operation of the lighting dots in accordance with the third information provided by said second determining means and the fourth information provided by said second dividing means.

3. An apparatus for driving a printer head which includes a plurality of lighting dots and scans a surface to be exposed by the printer head, said apparatus comprising:

first receiving means for receiving image data from an exterior of the apparatus;

second receiving means for receiving lighting mode designation data from an outside of the apparatus, said lighting mode designation data determining when the lighting dots should be lighted within one scanning time period of the printer head;

first determining means for determining a first lighting period of the lighting dots within the one scanning time period of the printer head, in accordance with image data supplied to the apparatus, so as to provide first information representing the determined first lighting period;

first dividing means for dividing the one scanning time period into m subline periods each being denoted by second information;

second determining means for determining a second lighting period of the lighting dots within each of the subline periods, in accordance with the first information provided by said first determining means and the second information provided by said first dividing means, so as to provide third information representing the determined second lighting period;

second dividing means for further dividing each of the subline periods into n portions to provide fourth information representing each of the portions; and means for controlling lighting operation of the lighting dots in accordance with the third information provided by said second determining means and the fourth information provided by said second dividing means.

4. The apparatus of claim 1, wherein said first determining means includes means for storing specific data which determines the first information within the one scanning time period of the printer head in accordance with image data to be printed by the printer head and respective light-output intensities of the lighting dots.

5. The apparatus of claim 1, wherein said first determining means includes:

a counter for counting image data clocks to provide lighting point address data, said image data clocks being synchronized to transmission of image data to be printed by the printer head; and a memory, which receives as address data the image data and the lighting point address data, and stores conversion data for converting the image data into the first information in accordance with light-output intensities of the lighting dots of the printer head.

6. The apparatus of claim 1, wherein said first dividing means includes a subline counter which counts subline clocks generated during the one scanning time period and is cleared each time the one scanning time period elapses, so as to provide a count result.

7. The apparatus of claim 6, wherein said second determining means includes:

a memory which receives as address data the first information and the count result and stores the third information, said memory providing the third information for determining lighting time of the printer head during one of the m subline periods.

8. The apparatus of claim 2, wherein said second determining means includes a memory which receives as address data the first information, the second information, and the mode information, and stores the third information, said memory providing the third information for determining lighting time of the printer head during one of the m subline periods.

9. The apparatus of claim 3, wherein said second determining means includes a memory circuit which receives as address data the first information, the second information, and the lighting mode designation data, and stores the third information, said memory circuit providing the third information for determining lighting time of the printer head during one of the m subline periods.

10. The apparatus of claim 6, wherein said second determining means includes a second counter which counts a plurality of counter clocks generated during one of the m subline periods and is cleared each time the subline clock is generated, so as to provide a second count result.

11. The apparatus of claim 10, wherein said controlling means includes:

means for comparing the third information with the second count result to provide a result of comparison; and means for determining which lighting dot of the printer head is to be lighted according to the result of comparison provided by said comparing means.

12. The apparatus of claim 1, wherein the printer head contains said second dividing means and said controlling means, and said controlling means includes means for transferring the third information to the printer head by m times for each one scanning time period of the printer head.

13. The apparatus of claim 2, wherein said lighting mode selecting means includes means for selecting as the mode information one of the following modes:

a forward lighting mode for lighting during a leading part of the one scanning time period;

a backward lighting mode for lighting during a trailing part of the one scanning time period;

a center lighting mode for lighting during a center part of the one scanning time period; and an average lighting mode for intermittently lighting during a whole part of the one scanning time period.

14. The apparatus of claim 13, wherein said lighting mode selecting means includes means for specifying one of the forward, backward, center, and average lighting modes according to the image data to be printed by the printer head.

15. The apparatus of claim 13, wherein said lighting mode selecting means includes means for designating one of the forward, backward, center, and average lighting modes.

16. The apparatus of claim 13, further comprising:
means for specifying one of the forward, backward, center, and average lighting modes in accordance with a command supplied from an outside of the apparatus.

17. The apparatus of claim 2, further comprising:
means for alternatively specifying a pair of forward and backward lighting modes in one scanning time period of the printer head, wherein said forward lighting mode is provided for lighting the printer head during a leading part of the one scanning time period, and said backward lighting mode is provided for lighting the printer head during a trailing part of the one scanning time period.

18. A system for driving a printer head including a plurality of lighting elements, said system comprising:
a lighting time designator for determining a first lighting period of the lighting elements within one scanning time period of the printer head, thereby providing first information;
a first divider for dividing the one scanning time period into m subline periods each being denoted by second information;
a light timing controller for determining a second lighting period of the lighting elements within one of the m subline periods based on the first information and the second information, thereby providing third information representing the determined second lighting period;
a second divider for further dividing each of the subline periods into n portions to provide fourth information representing each of the portions; and
means for controlling lighting operation of the lighting elements based on the third information and fourth information.

19. A system for driving a printer head including a plurality of lighting elements, said system comprising:
a selector for selecting at least one of predetermined lighting modes by which determined is when the lighting elements should be lighted within one scanning time period of the printer head, so as to provide a mode information representing the selected lighting mode;
a first divider for dividing the one scanning time period into m subline periods each being demoted by first dividing information representing a fragment of the scanning time period;
means for determining a lighting period of the lighting elements within one of the subline periods based on the mode information and the first dividing information, thereby providing lighting information representing the determined lighting period;
a second divider for further dividing each of the subline periods into n portions to provide second dividing information representing the further divided scanning time period; and
means for controlling lighting operation of the lighting elements based on the lighting information and second dividing information.

20. The system of claim 19, further comprising:
a lighting time designator for designating a lighting period of the lighting elements within the one scanning time period of the printer head, so as to provide a lighting time information,
wherein said determining means includes means for determining the lighting period of the lighting elements based on the mode information, first dividing information, and the lighting time information.

21. An apparatus for driving a printer head including a plurality of lighting dots arranged in a line corresponding to one scanning time period, said apparatus comprising:
first dividing means for dividing the one scanning time period into m subline periods;
determining means for determining a lighting period of the lighting dots within each of the subline periods;
second dividing means for dividing each of the subline periods into n dot lighting periods; and
means for controlling lighting operation of the lighting dots in accordance with the lighting period determined by said determining means and the n dot lighting periods obtained by said second dividing means.

22. An apparatus for driving a printer head including a plurality of lighting dots arranged in a line corresponding to one scanning time period, said apparatus comprising;
first determining means for determining a first lighting period of the lighting dots within one scanning time period of the printer head in accordance with image data supplied to the apparatus;
dividing means for dividing the one scanning time period into equal m subline periods;
second determining means for determining a second lighting period of the lighting dots within each of the subline periods in accordance with the first lighting period determined by said first determining means and the m subline periods; and
means for controlling lighting operation of the lighting dots in accordance with the periods determined by said second determining means.

23. An image forming apparatus for forming visible image corresponding to image data, comprising:
a printer head including a plurality of lighting dots arranged in a line corresponding to one scanning time period for forming light dots according to the image data;
means for driving said printer head to form the light spots in response to the image data; and
means for forming a visible image in correspondence with the light spots supplied from said printer head;
wherein said driving means includes;
first dividing means for dividing the one scanning time period into m subline periods;
determining means for determining a lighting period of the lighting dots within each of the subline periods;
second dividing means for dividing each of the subline periods into n dot lighting periods; and
means for controlling lighting operation of the lighting dots in accordance with the lighting period determined by said determining means and the n dot lighting periods obtained by said second dividing means.

24. An image forming apparatus for forming a visible image corresponding to image data, comprising:
a printer head including a plurality of lighting dots arranged in a line corresponding to one scanning time period for forming light dots according to the image data;

means for driving said printer head to form the light spots in response to the image data; and means for forming a visible image in correspondence with the light spots supplied form said printer head;

wherein said driving means includes:

first determining means for determining a first lighting period of the lighting dots within one scanning time period of the printer head in accordance with image data supplied to the apparatus;

dividing means for dividing the one scanning time period into equal m subline periods;

second determining means for determining a second lighting period of the lighting dots within each of the subline periods in accordance with the first lighting period determined by said first determining means and the m subline periods; and means for controlling lighting operation of the lighting dots in accordance with the periods determined by said second determining means.

* * * * *